(12) United States Patent
Leblond

(10) Patent No.: US 11,282,380 B2
(45) Date of Patent: *Mar. 22, 2022

(54) AUTOMATED CAMERA RESPONSE IN A SURVEILLANCE ARCHITECTURE

(71) Applicant: Leverage Information Systems, Inc., Woodinville, WA (US)

(72) Inventor: Raymond G. Leblond, Riverside, CA (US)

(73) Assignee: Leverage Information Systems, Inc., Woodinville, WA (US)

(*) Notice: Subject to any disclaimer, the term of this patent is extended or adjusted under 35 U.S.C. 154(b) by 460 days.

This patent is subject to a terminal disclaimer.

(21) Appl. No.: 15/721,647

(22) Filed: Sep. 29, 2017

(65) Prior Publication Data

US 2018/0040241 A1 Feb. 8, 2018

Related U.S. Application Data

(63) Continuation of application No. 12/883,754, filed on Sep. 16, 2010, now Pat. No. 9,786,164, which is a continuation-in-part of application No. 12/154,477, filed on May 23, 2008, now Pat. No. 9,035,768.

(60) Provisional application No. 61/243,311, filed on Sep. 17, 2009.

(51) Int. Cl.
*G08G 1/017* (2006.01)
*G06T 17/05* (2011.01)
*G08B 13/196* (2006.01)

(52) U.S. Cl.
CPC .......... *G08G 1/0175* (2013.01); *G06T 17/05* (2013.01); *G08B 13/19695* (2013.01)

(58) Field of Classification Search
CPC . G08G 1/0175; G06T 17/05; G08B 13/19695
See application file for complete search history.

(56) References Cited

U.S. PATENT DOCUMENTS

| | | | |
|---|---|---|---|
| 5,974,236 A | 10/1999 | Sherman | |
| 6,271,752 B1 | 8/2001 | Vaios | |
| 6,735,630 B1 | 5/2004 | Gelvin et al. | |
| 7,124,427 B1 | 10/2006 | Esbensen | |
| 7,382,244 B1* | 6/2008 | Donovan | H04L 41/22 340/506 |
| 2002/0067259 A1* | 6/2002 | Fufidio | G08B 13/183 340/541 |
| 2004/0148518 A1 | 7/2004 | Grundback et al. | |

(Continued)

*Primary Examiner* — James J Yang
(74) *Attorney, Agent, or Firm* — Lowe Graham Jones PLLC

(57) ABSTRACT

A detection and response device for a surveillance system detects events, responds to events, or both. The detection and response device may be used with or provided by a variety of surveillance systems, including peer to peer surveillance architectures. The device may utilize one or more defined geospaces. If an event occurs in a geospace a predefined response may then be provided. The predefined response may include automatically targeting one or more cameras to areas relevant to the event and presenting one or more predefined views optimized for viewing the event. If an event does not occur within a geospace, the detection and response device may provide one or more default responses.

2 Claims, 11 Drawing Sheets

(56) References Cited

U.S. PATENT DOCUMENTS

| | | |
|---|---|---|
| 2004/0189816 A1* | 9/2004 | Nakazawa ......... H04N 21/6181 |
| | | 348/211.2 |
| 2006/0028997 A1 | 2/2006 | McFarland |
| 2006/0050642 A1 | 3/2006 | Chini et al. |
| 2006/0176834 A1 | 8/2006 | Dickerson et al. |
| 2006/0256195 A1* | 11/2006 | Ogawa .................. H04N 7/185 |
| | | 348/143 |
| 2007/0076094 A1 | 4/2007 | Dickerson et al. |
| 2007/0150565 A1 | 6/2007 | Ayyagari et al. |
| 2010/0073164 A1 | 3/2010 | Torvmark |

* cited by examiner

AUTOMATED CAMERA RESPONSE IN A SURVEILLANCE ARCHITECTURE

CROSS-REFERENCE TO RELATED APPLICATION

This application is a continuation of U.S. patent application Ser. No. 12/883,754, titled Automated Camera Response in a Surveillance Architecture, filed Sep. 16, 2010, which is a continuation-in-part of U.S. patent application Ser. No. 12/154,477, titled Peer to Peer Surveillance Architecture, filed May 23, 2008. U.S. patent application Ser. No. 12/883,754 also claims priority to U.S. Provisional Patent Application Ser. No. 61/243,311, titled Automated Camera Response in a Surveillance Architecture, filed Sep. 17, 2009.

BACKGROUND OF TIE INVENTION

1. Field of the Invention

The invention relates to surveillance systems, particularly to a peer to peer surveillance architecture or surveillance system capable of capturing and providing video, audio, and other information regarding a detected event when the event is detected.

2. Related Art

Surveillance is widely utilized in modern society. Governments, corporations, groups, and even individuals use surveillance to promote public safety and to deter and prevent crime as well as for general monitoring.

Traditional surveillance systems generally provide audio and video monitoring through an interconnected hierarchical system. For example, a closed-circuit television (CCTV) system may provide video monitoring through a set of closed-circuit cameras connected to a single stand alone aggregation device where the video feeds from the cameras are sent. The captured information may then be viewed through the aggregation device such as on one or more video screens.

To function properly, a CCTV or other similar traditional system requires a central controller or device which accepts signals from cameras and which may also provide control instructions to the devices. This allows every camera to be monitored and controlled from a single location. However, this introduces a single point of failure in that the failure of the central controller would render the entire surveillance system inoperative. Thus, such systems are said to be fragile as a failure of the central controller or the connections between the controller and the cameras either impairs or completely prevents the surveillance system from functioning. This fragility is highly undesirable in a surveillance system especially where public safety is concerned.

With the introduction of digital and networked devices, surveillance cameras could be connected via standard wired or wireless network connections. This was an improvement in that one or more standard network connections could be used by capture devices rather than a specialized, dedicated, or proprietary video connection. In addition, digital video may be sent across vast distances through digital networks, such as the Internet, which was not possible without great expense using traditional CCTV systems.

However, network based surveillance systems continue to rely on a centralized controller to function. The video or other surveillance information is still aggregated at the centralized controller which facilitates observation and analysis of the information gathered. Thus, the single point of failure has remained through the transition from traditional CCTV and similar systems to network based surveillance systems.

It is true that these traditional systems may be configured to have backup central controllers. While these backup systems provide increased reliability they do so at increased cost and often do not provide a seamless transition from the failed equipment to its associated backup device. In surveillance, any downtime including downtime associated with switching to a backup device is highly undesirable.

Traditional systems are also difficult to update for new circumstances or environments. For example, moving one or more cameras to a new location or including additional cameras or other collection devices requires installation of at least one connection from each camera or collection device to the central controller. These connections are often physical connections, such as network or coaxial cabling, which are difficult to install especially in existing structures. In addition, traditional systems are generally configured to provide general surveillance without regard for a particular situation or event.

From the discussion that follows, it will become apparent that the present invention addresses the deficiencies associated with the prior an while providing numerous additional advantages and benefits not contemplated or possible with prior art constructions.

SUMMARY OF THE INVENTION

Detection and automated response capabilities for various surveillance systems, hardware, or software are disclosed herein. The detection capabilities may be used to detect events or occurrences as desired. The response capabilities may then be used to provide a variety of responses to the event. The responses may be based on characteristics of the event. For example, the response may depend on the type of event, the location of the event, or both. As will be discussed further below, predetermined or preconfigured responses may be provided when an event occurs within one or more predefined locations, while a default response may be provided for events occurring outside these locations. The detection capabilities, response capabilities, or both may be provided by peer to peer surveillance architectures, traditional or other surveillance systems, both, or a combination thereof.

The detection and response capabilities may be implemented in different ways. For instance, in one exemplary embodiment a detection and response device for automatically selecting and presenting surveillance information collected by one or more capture devices is provided. The detection and response device may comprise one or more transceivers configured to receive data indicating that an event has occurred, one or more storage devices, and a response system. A routing system configured to share the surveillance information from the capture devices with one or more mobile displays may also be provided.

The storage devices may be configured to store one or more geospaces comprising data identifying one or more physical areas, one or more instructions associated with each of the geospaces, and one or more user interface settings associated with each of the geospaces. The response system may be further configured to transmit one or more commands to the capture devices through the transceivers. The commands may be defined by the instructions.

The response system may be configured to identify an event geospace (where the event geospace is one of the geospaces where the event occurred), retrieve the instructions associated with the event geospace, and execute the instructions associated with the event geospace to provide a response to the event.

In addition the response system may retrieve the user interface settings associated with the event geospace, and establish, on a display, a predefined view presenting surveillance information from at least one of the capture devices according to the user interface settings associated with the event geospace. The response system may be configured to establish the predefined view such that the predefined view only presents surveillance information from the capture device identified in the user interface settings.

It is noted that the user interface settings may include data defining the location of one or more user interface windows. In addition or alternatively, the user interface settings may include data identifying at least one of the capture devices. The storage devices may be configured to store such data along with the user interface settings. The transceivers may be configured to receive location information identifying the location of one or more mobile units, and the response system may be configured to present the location of the mobile units in the predefined view.

In another exemplary embodiment, a surveillance system for providing automated responses to one or more events is provided. The surveillance system may comprise one or more storage devices configured to store one or more geospaces identifying one or more physical areas, and at least one detection and response device in communication with one or more cameras.

The detection and response device may be configured to detect the occurrence of an event, and determine if the event has occurred within at least one of the geospaces. The detection and response device may control at least one of the cameras to target one or more first areas in response to an event that occurs within a first geospace and control at least one of the cameras to target one or more second areas in response to an event that occurs within a second geospace. The second geospace will typically be distinct from the first geospace. At least one of the first areas may be outside the first geospace. In addition or alternatively, at least one of the first areas may be a remote transportation link such as a road, highway, or airport.

If an event occurs outside the geospaces, the detection and response device may be configured to respond by selecting at least one of the cameras to target the event based on the camera range or viewable area of the cameras, and controlling the selected camera(s) to target the event. The camera or cameras targeting the event may be those nearest the event relative to the other cameras. The detection and response system may control at a camera to target the first areas or the second areas by moving the camera or cameras to target the first areas or the second areas.

The detection and response device may be further configured to present a predefined view on a display. The predefined view may comprise video from a preselected one of the cameras. For example, the detection and response device may be further configured to present a first predefined view comprising video from a first preselected one of the cameras in response to the event that occurs within the first geospace, and present a second predefined view comprising video from a second preselected one of the cameras in response to the event that occurs within the second geospace. The first predefined view and the second predefined view may be presented on a display.

In another exemplary embodiment, a method for responding to an event with a surveillance system having one or more cameras is provided. The method may comprise receiving one or more geospaces identifying one or more physical areas and storing the geospaces on one or more storage devices, receiving one or more preselected areas and storing the preselected areas associated with at least one of the geospaces, detecting the occurrence of the event with one or more sensors, and determining if the event occurred within the geospaces.

At least one of the cameras may be targeted at least one of the preselected areas if the event has occurred within the geospaces. At least one of the cameras within range of the event may be identified and targeted at the event if the event has occurred outside the geospaces. For example, at least one of the cameras may be selected to target the event based on a camera range or viewable area of the cameras if the event has occurred outside the one or more geospaces.

One or more video streams from at least one of the cameras may be presented on a display. At least one of the video streams may be transmitted to or shared with a mobile unit based on input from a user. For example, input identifying a mobile unit may be used to select the mobile unit to share a video stream with.

The method may also include receiving one or more user interface settings identifying one or more positions for the video streams and storing the user interface settings associated with at least one of the geospaces. The video streams may be presented at the positions on the display. Various other elements may be displayed on the display. For example, the location of one or more mobile units may be received and presented on the display. In addition, one or more camera controls may be displayed on the display in response to the user selecting one of the cameras.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

Figure 1:
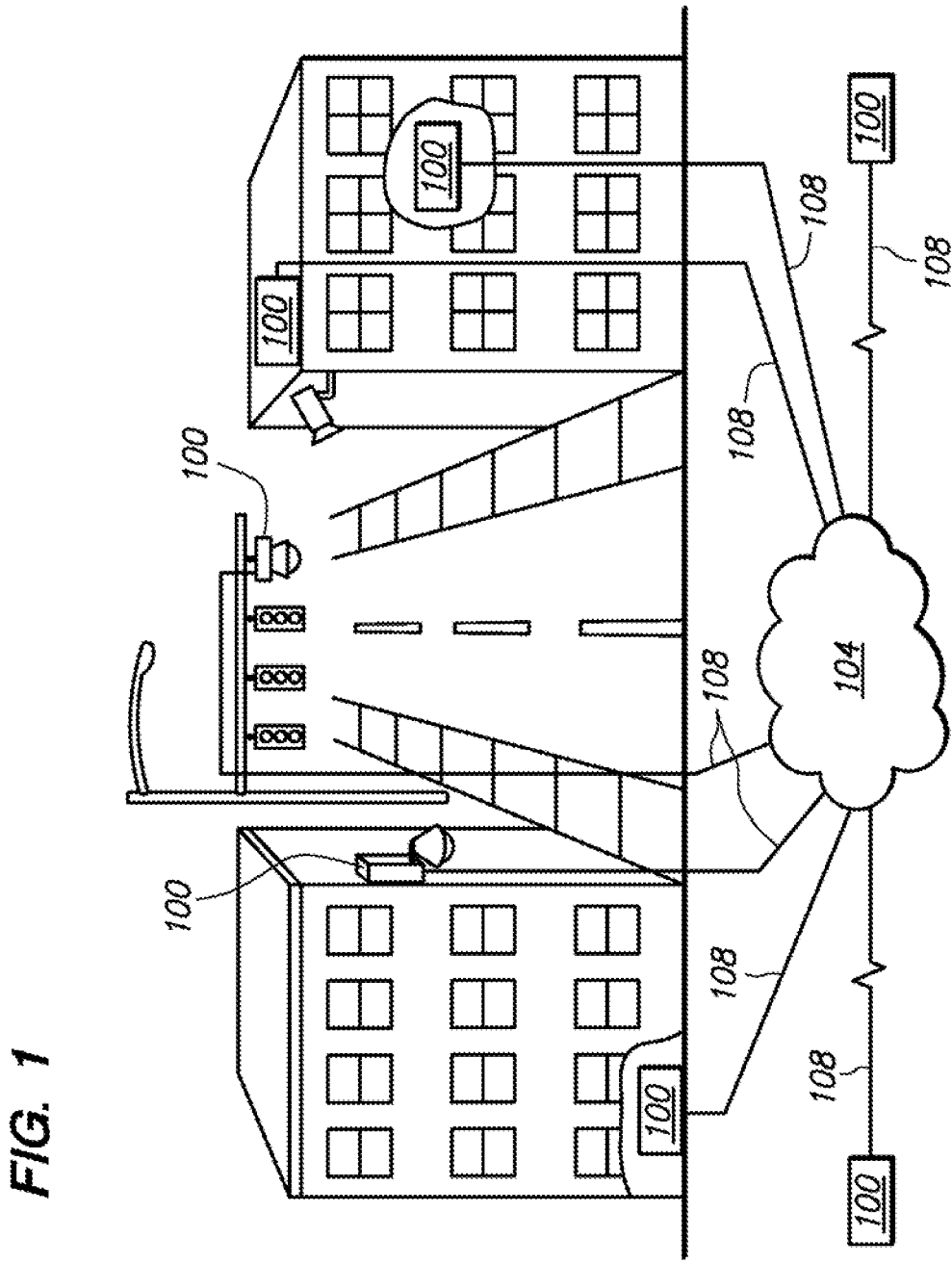
FIG. 1 illustrates an example embodiment of the peer to peer surveillance architecture as it may be deployed.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Generally, the peer to peer surveillance architecture comprises one or more nodes configured to capture, analyze, store, and present surveillance information. As discussed further below, surveillance information comprises a wide variety of information including video and audio. As used herein, peer to peer means that each node within the surveillance architecture operates such that it is not dependent on (i.e. does not rely on) its peer nodes. This allows the surveillance architecture to have no single point of failure making it extremely robust. The failure of or damage to individual nodes, components, or communication links cannot cause the system to function at less than full capacity when a peer to peer or non-dependent relationship exists between each node and its peers.

The surveillance architecture may be configured to balance requirements and capability. For example, the architecture may be configured for a high or complete redundancy, but may also be configured according to particular requirements based on the necessary functionality, redundancy, and budget considerations.

As will be described further below, the peer to peer surveillance architecture generally comprises one or more capture nodes, server nodes, content storage nodes, and viewing nodes. The capture nodes generally record or capture surveillance information and may be configured to capture specific types of information, such as a camera node which captures video surveillance information. The captured information may be viewed, stored, or analyzed by the other nodes, including other capture nodes. The architecture is able to provide complete redundancy through these nodes, which are configured to function without depending on any other node or any single communication link.

The peer to peer surveillance architecture combines this redundancy with high adaptability and easy deployment, both of which are among the advantages over traditional surveillance systems. This allows collection of surveillance information from a wide range of target areas and is generally made possible through various wireless, cellular, and other network technologies, and allows for stationary and mobile surveillance systems that may be rapidly deployed virtually anywhere as desired. For example, the architecture allows capture nodes to be mounted on buildings, utility poles, in jails, in parks, throughout downtown areas, and intersections even where there are no physical communication links such as network or other cables.

The advantages of the peer to peer surveillance architecture's reliability and adaptability can be readily seen with regard to public safety. Surveillance enhances public safety and security by allowing police and other security agencies or organizations to monitor citizen safety, specific events, congestion, and even fight graffiti. In addition, surveillance serves as a force multiplier, allowing for example, police or municipalities to expand their coverage without additional officers. Thus, the architecture's reliability ensures reliable surveillance for these purposes, and its adaptability allows rapid deployment to monitor special events, such as but not limited to sporting events or conventions as well as the ability to quickly and easily remove surveillance once the event is over.

The peer to peer surveillance architecture may also provide analysis of surveillance information. This greatly expands surveillance capabilities without the need for increased personnel as well. For example, the architecture may provide automated license plate recognition, theft detection, and traffic congestion monitoring. The architecture may provide notifications to users or to nodes within the architecture when certain events are present or detected in the surveillance information.

The peer to peer surveillance architecture will now be described with regard to FIGS. 1-7. FIG. 1 illustrates an exemplary embodiment of the surveillance architecture deployed in an urban setting. In one embodiment, the surveillance architecture comprises one or more nodes 100 communicating through a network 104 via one or more communication links 108.

The network 104 allows communication between one or more nodes 100 to occur and may be any type of communication network or path now know or later developed. The network 104 may comprise various communication links 108 including wired and wireless links and utilize various communication protocols. In one embodiment, the network 104 is a packet switched network such as an Internet Protocol (IP) network. Any packet based communication protocol, known or later developed, may be used. This includes connection based protocols such as Transmission Control Protocol (TCP), frame relay, and Asynchronous Transfer Mode (ATM). This also includes connectionless protocols such as User Datagram Protocol (UDP). It is contemplated that the network 104, or a portion of it, may also be a circuit switched network in one or more embodiments and that communications between nodes may be encrypted, such as through one or more Virtual Private Networking (VPN) connections to secure communications across the network.

Each node 100 communicates through the network 104 via one or more communication links 108. The communication links 108 may each represent one or more independent communication links to a network 104 thus allowing each node 100 to have redundant communication links 108. The communication links 108 may be any communication link capable of carrying data now known or later developed. For example, the communication link 108 may comprise electrical, optical, or other cable. The communication link 108 may utilize physical layer topologies such as but not limited to Category 5 or 6, SM or MM fiber, DSL and Long Range Ethernet. The communication link 108 may also be a wireless communication link such as a cellular or other wireless link. Wireless communication links 108 may utilize physical layer topologies such as but not limited to 802.11a/ b/g, WiMAX, EVDO, GPRS, Long Range Ethernet, and DSL as well as any other wireless protocol capable of carrying data now know or later developed. It is contemplated that these wireless connections or networks may operate across on one or more frequencies capable of supporting data communication such as cellular frequencies, the 4.9 GHz public safety frequency, licensed and unlicensed wireless (e.g. 70 GHz and 90 GHz), 2.4 GHz, and 5.8 GHz, and other microwave and satellite communication frequencies among others. Wireless connections may also comprise optical wireless connections, such as a laser or other light based communication. It is noted that, as described regarding the network 104, any communication protocol now know or later developed whether packet switched, circuit switched, connection based, connectionless, or otherwise may be used to facilitate communication via the communication link 108.

Figure 2A:
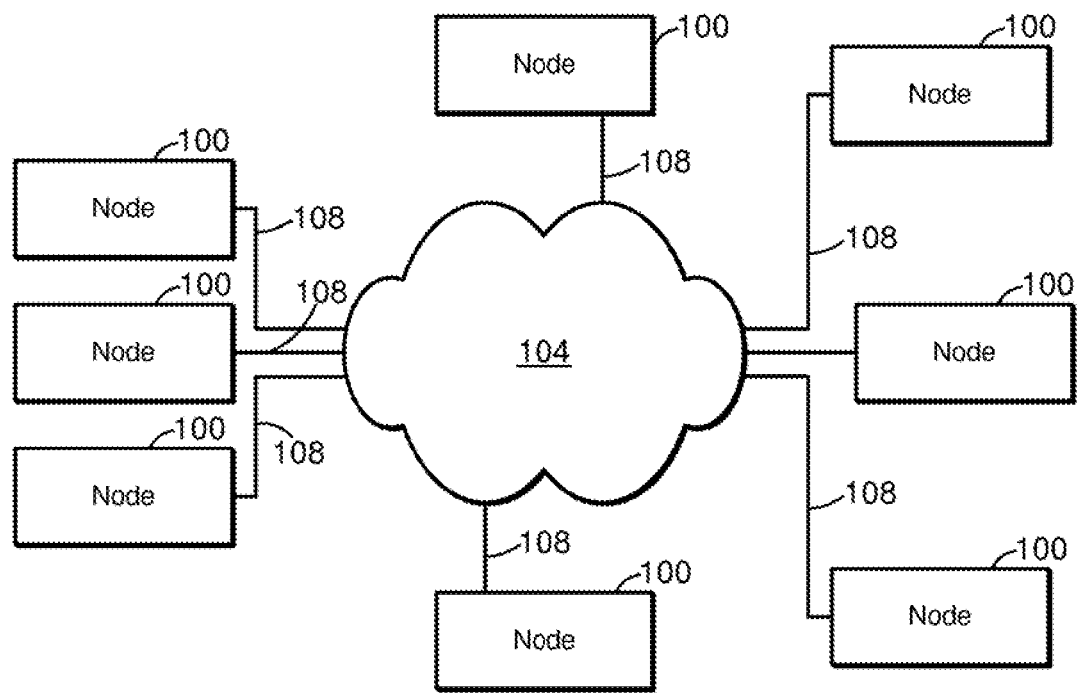
FIG. 2A is a block diagram illustrating an example embodiment of the peer to peer surveillance architecture where each node is connected through a network.
Figure 2B:
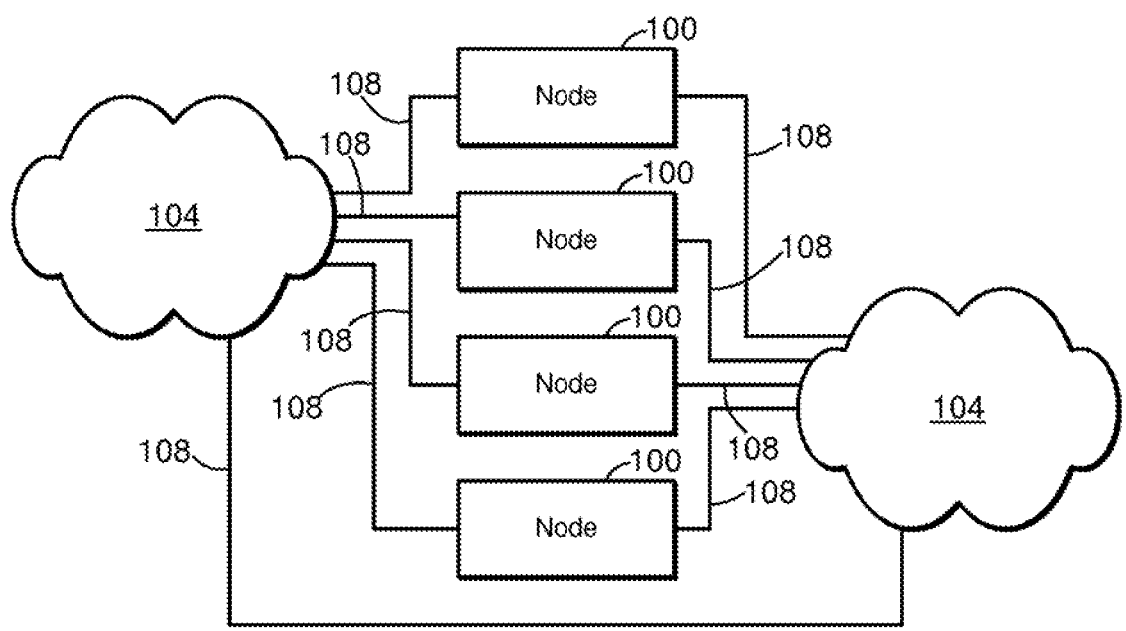
FIG. 2B is a block diagram illustrating an example embodiment of the peer to peer surveillance architecture where each node is connected through more than one independent network.

FIG. 2A is a block diagram illustrating an embodiment of the peer to peer surveillance architecture where each node is connected through one network, similar to the above. FIG. 2B is a block diagram illustrating an embodiment of the surveillance architecture where each node 100 is connected through more than one independent network 104. In addition, the networks 104 themselves may be connected by a communication link 108 as well. Thus, communications to and from each node 100 may be routed through a single network or both networks. The communication links 108 from each node 100 to each network 104 provide redundancy allowing the surveillance architecture to fully function even if one or more of the communication links 108 are not operational. In addition, as stated above, each communication link 108 may comprise one or more independent connections, as desired, further increasing the architecture's reliability.

Of course, a network 104 or networks may be configured in a multitude of ways as is well known in the art. In one or more embodiments, the network 104 may be a single switch or router such as in a local area network, or may include one or more switches, routers, and other devices, such as a wide area network or the Internet. It is noted that nodes 100 may also communicate directly through one another rather than through one or more other devices. For example, two nodes 100 may have a direct wireless connection between one another such as an ad hoc 802.11a/b/g connection or a direct cable connection. It is contemplated that the nodes 100 may communicate with a network through another node in one or more embodiments.

In one or more embodiments, each node 100 may be connected to every other node through a logical connection, such as for example, nodes connected to one another in an IP or other packet switched network. Generally, a logical connection may be thought of as the end to end connection which allows data from a source to reach its proper destination as it travels across one or more physical or wireless connections. The term virtual matrix switch as used herein refers to the logical connections that allow communication between the nodes 100 of a surveillance system.

The virtual matrix switch allows surveillance information to be communicated between individual nodes 100, but also supports multicasting surveillance information to a plurality or all of the nodes regardless of the underlying physical or wireless connection type. When connected through a virtual matrix switch, each node 100 will be in a virtual or logical network with only its peer nodes in one or more embodiments. To illustrate, in one embodiment, each node 100 is connected to peer nodes by one or more networks and communication links. Though these networks and communication links may be public or private networks and communication links shared by other devices, the virtual matrix switch provides a virtual or logical network which only the nodes 100 are part of. Communications within the virtual matrix switch may be encrypted, such as through GRE tunneling or VPN connections, in some embodiments.

Figure 3:
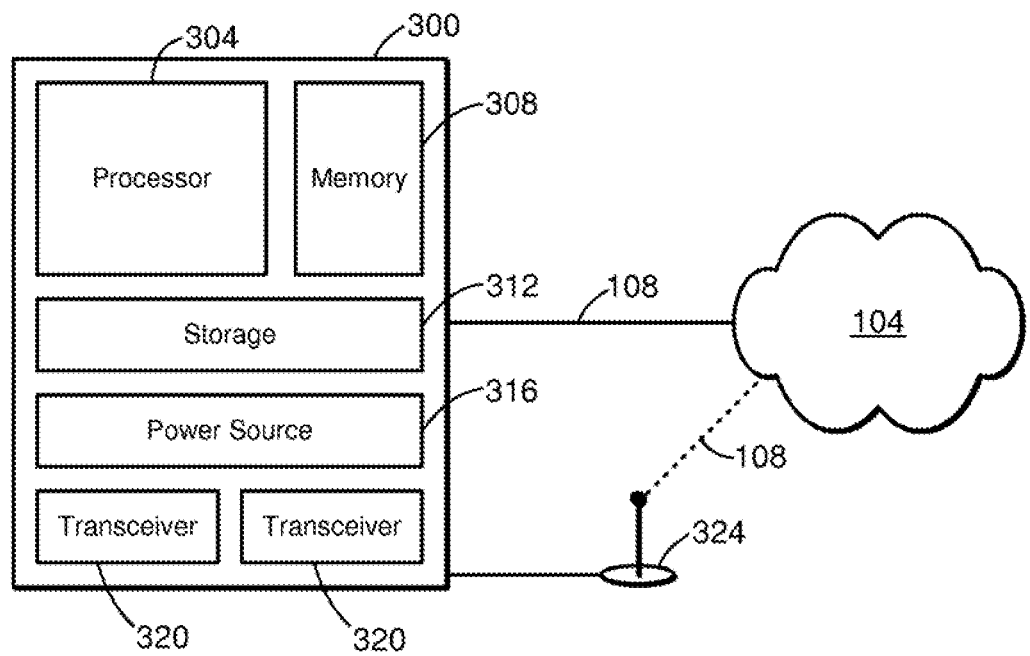
FIG. 3 is a block diagram illustrating an example embodiment of a node.

FIG. 3 illustrates an embodiment of a node 100. In one or more embodiments, a node 100 may comprise any combination of one or more processors 304, memory 308, and storage 312 that is capable of processing, and executing machine readable code from the memory 308, storage 312, or both in one or more embodiments. Generally, the processor 304 may be any device capable of executing machine readable code and transmitting and receiving data. The memory 308 and server storage 312 may be any data storage device or devices capable of storing data. The memory 308 and storage 312 will typically allow both reading and writing data, however, in some embodiments at least a portion or all of either the memory 308 or storage 312 may be read only. It is noted that in some embodiments, memory 308 or storage 312 alone will be sufficient to store any data or machine readable code required by the node 100 and that because of this, not all embodiments will require both memory 308 and storage 312.

In some embodiments, the machine readable code controls the operation of the nodes 100. The machine readable code may be one or more programs such as an operating system running one or more applications. The machine readable code may also provide compression and decompression of surveillance information as will be described below. In one embodiment, the machine readable code is configured to allow a node 100 to communicate by unicast, multicast, or broadcast over a virtual matrix switch.

In one or more embodiments, a node 100 comprises one or more transceivers 320 configured for two-way communication in that each transceiver may receive and transmit information or data to one or more other nodes 100 through one or more communication links 108, one or more networks 104, or a combination thereof. A transceiver may be configured to communicate by unicasting, multicasting, or broadcasting information through one or more wired or wireless connections. In some embodiments, one or more of the transceivers 320 may only transmit or only receive data. It is contemplated that a transceiver 320 may also communicate with other external devices as well as nodes 100.

In one or more embodiments, the one or more transceivers 320 may be connected to one or more communication links 108. As stated above, the communication links 108 may be physical or wireless links and may utilize one or more communication protocols.

As stated, wireless links in one or more embodiments may also comprise a cellular link using various communication protocols. For example, a transceiver 320 may be configured to communicate through a TDMA, CDMA, FDMA, or other cellular network. A cellular communication link 108 allows for long range wireless communication and provides the advantage of network availability even in remote areas. Though cellular communication links 108 may have limited bandwidth, the invention provides data compression to overcome this limitation as will be discussed further below. It is contemplated that a wireless communication link 108 may comprise wireless communication with one or more satellites and that wireless communication may be accomplished through one or more antenna 324 if desired. The antenna 324 may be internal to the node 100 or may be an external antenna connected to the node 100.

As stated, each node 100 may have one or more communication links 108 for redundancy. This may be accomplished by configuring a node 100 with more than one transceiver 320, or by configuring a node with a single transceiver capable of having more than one communication link. Only one communication link 108 is necessary for communication, thus any additional communication links 108 may be used to increase available bandwidth such as by simultaneously utilizing all available communication links 108 to transmit data, receive data, or both. However, a node 100 may also be configured to utilize the additional communication links 108 only when the currently used link or links is damaged or fails. Also, a node 100 may be configured to choose which communication link 108 to use based on a predetermined order or based on the available bandwidth, latency, or other characteristic of the links.

It is contemplated that any combination of communication links 108 may be used by a single node 100. For example, a node 100 may have an IP communication link 108 through wired Ethernet, a cellular communication link, and a wireless 802.11 link simultaneously. One or more of these communication links 108 may be used simultaneously or may remain unused (i.e. inactive) unless one or more of the other links is damaged or fails.

In one embodiment, the nodes 100 communicate through a communication link 108 using IP based communication. IP networks are inherently reliable and may be configured to automatically route data through alternate links based on network congestion or availability. IP based communication also allows multicasting which may be used to reduce bandwidth utilization. In addition, a node 100 communicating via IP may communicate to or through any IP based device or network including the worldwide Internet. This allows nodes 100 to communicate around the world with very little expense. Thus, IP networks are well suited for a surveillance application, however, it is noted that the invention may be used with any type of network or communication protocol.

In one or more embodiments, a node 100 also comprises a power source 316. The power source 316 provides power to the node 100 so that it may be used without being connected to an electric power grid. The power source 316 may be any device capable of providing sufficient power for a node 100. Such devices include but are not limited to batteries, solar panels, wind turbines, and generators or a combination thereof. In one embodiment, a node 100 has a power source 316 comprising one or more batteries and a solar panel which recharges the batteries. In another embodiment, a generator is provided which may power to node 100 directly or be used to recharge any batteries the node may have. The generator or other power supply may be refueled periodically or as necessary to provide power. It can thus be seen that a node 100 with a power source 316 and a wireless communication link 108 may be quickly and easily deployed virtually anywhere.

Components of the nodes 100 such as the processor 304, memory 308, storage 312, or transceivers 320 may communicate with one another in one or more embodiments. In addition, the power supply 316 component may be configured to communicate power utilization, power reserves, battery condition, or other information in one or more embodiments. Components of the nodes 100 also include capture devices, screens, and control interfaces as will be described further below. It is contemplated that other devices may be components of a node 100 such as but not limited to one or more lights or speakers.

In one or more embodiments, communication between components takes place through one or more optical, electrical, or wireless data connections. These connections may allow unidirectional or bi-directional communication between the components. It is contemplated that in some embodiments, not every component will be connected to every other component.

In one embodiment, only the processor 304 is connected to the memory 308, storage 312, and one or more transceivers 320. In another embodiment, some components may be connected to more than one other component. For example, the one or more transceivers 320 may be connected to the memory 308, storage 312, or both, in addition to being connected to the processor 304. In this manner, the one or more transceivers 320 may utilize the memory 308, storage 312, or both without communicating with the processor 304. It is contemplated that in some embodiments, one or more components may communicate within the node through a connection with another component.

In some embodiments, the components described above may be "off the shelf" products from various manufacturers. For example, a node may be a computer having a processor 304, memory 308, storage 312, and one or more transceivers 320 installed on a motherboard. In other embodiments, the components may be provided by one or more independent "off the shelf" products. For example, the processor 304, memory 308, and storage 312 may be a computer or video processing device connected to an external camera, and one or more external transceivers 320. The processor 304 may be a stand alone video processor such as, for example, a device which accepts video as an input and compresses, analyzes or otherwise processes the video and outputs the result. The storage 312 may be comprise one or more stand alone storage devices such as, for example, a set of hard drives, a RAID array, or USB or Firewire storage. It is contemplated that there may be more than one of each component for redundancy. Where more than one of the same component is included in a node 100, it is contemplated that each may be used simultaneously or that one or more redundant components may remain inactive until needed.

It is contemplated that a node 100 may be located in mild environments and harsh or extreme environments (e.g. extreme heat, cold, moisture, or wind). Thus, each node 100 may be configured with various enclosures or structures capable of supporting its components. For example, a node 100 used indoors may have an enclosure as simple as an equipment rack or shelf. Alternatively, an indoor enclosure may fully enclose the components of a node 100 such as with a metal, plastic, or other rigid cover. A node 100 for outdoor use may have a more rugged enclosure such as by using stronger or thicker materials. In addition, some enclosures may have wind, water, ice, heat or other weather resistance. This may be accomplished by insulating the enclosure and by including one or more seals to prevent weather infiltration. Enclosures may include structures that do not fully enclose a node's components, and may include structures now known and later developed.

Generally, an enclosure will be a single continuous rigid structure which supports all the components of a node 100. A component of a node 100 will be considered to be supported by the enclosure as long as the component is ultimately supported by the enclosure. A component may be supported by the enclosure through one or more other structures. For example, a component held within or attached to its own case or support is considered supported by the enclosure as long as its case or support is attached to the enclosure.

Of course, in some embodiments, some components may not be supported or attached to an enclosure. For example, a camera may be attached directly to a wall rather than to an enclosure. In addition, some enclosures may have portions that may be removably attached to allow for repair or replacement. It is noted that, such enclosures are still considered to be a single continuous structure because each removably attached portion will be attached when the node is in operation.

Types of nodes according to the invention will now be described. These nodes may include the basic components of and may be configured according to the various embodiments of the nodes 100 described above. In addition, the following nodes generally include additional components suited for one or more specific tasks in their various embodiments.

Figure 4:
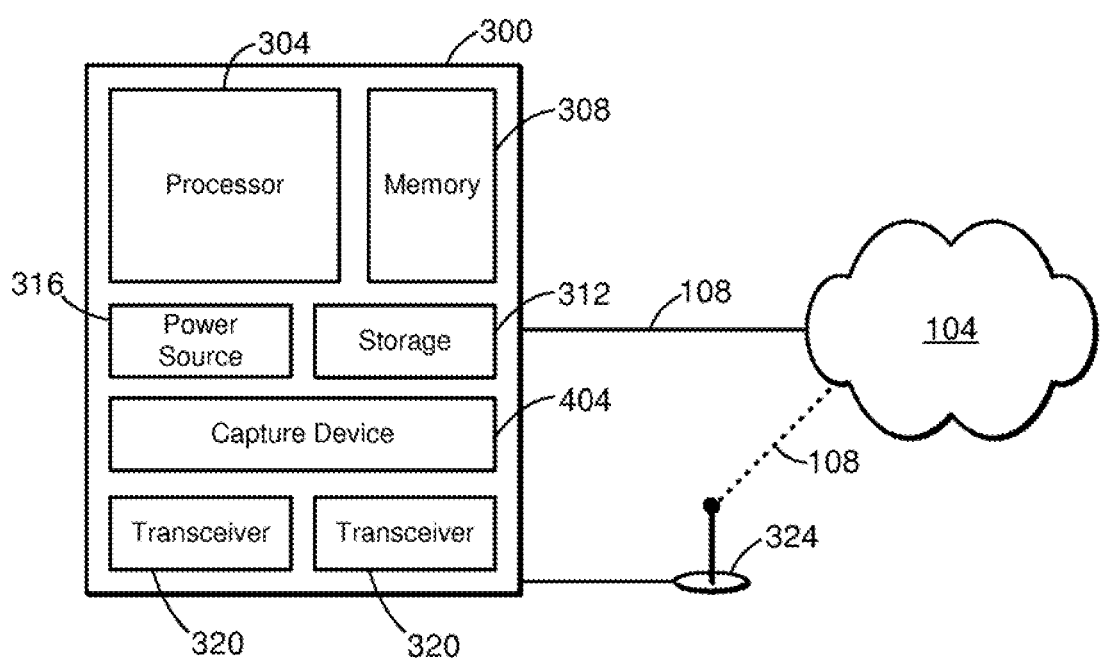
FIG. 4 is a block diagram illustrating an example embodiment of a capture node.

FIG. 4 illustrates an embodiment of a capture node 400 of the peer to peer surveillance system. Generally, a capture node 400 is a node configured to capture surveillance information from one or more target areas. A target area is generally an area where useful surveillance information may be gathered, but may be any area or location. Surveillance information may include video, audio, or both, as well as information from specific sensors such as voltage, current, temperature, radiation, motion, or light sensors. Surveillance information may also include information or data derived from the above information, or data received from an external source such as wireless stock ticker, traffic, GPS, or weather data.

In one or more embodiments, a capture node 400 may comprise a processor 304, memory 308, storage 312, power source 316, one or more transceivers 320, one or more antenna 324, or various combinations thereof as described above. Regardless of the configuration, a capture node 400 will generally include one or more capture devices 404 as one of its components in one or more embodiments. Once captured, surveillance information may be transmitted from the capture node 400 via its one or more transceivers 320.

A capture device 404 may be a sensor or other device configured to receive, record, or otherwise capture surveillance information. The capture device 404 may be integrated with one or more components of the capture node 400 in one or more embodiments. For example, the capture device 404 may be a video capture board. The capture device 404 may also be a stand alone device in some embodiments. For example, the capture device 404 may be a camera connected to the processor 304 of the capture node 400. It is contemplated that the capture device 404 may be movable (e.g. a pan, tilt, and zoom camera) to focus on specific events or areas periodically, in response to an event, or as desired.

As stated, there is a wide variety of surveillance information, and thus, a similarly wide variety of capture devices 404 are contemplated. To illustrate, the capture device 404 may also comprise one or more cameras, microphones, temperature sensors, radiation detectors, motion detectors. In addition, the capture device 404 may be a data input such as for receiving telemetry from other devices. For example, the capture device 404 may be a radio receiver configured to receive traffic, weather, GPS, or even stock ticker information. The capture device 404 may be a voltage or current sensor such as for detecting voltage or current usage or for detecting a completed circuit such as in contact sensors for security systems.

In one embodiment, the capture node 400 is configured to capture video surveillance information. As such, the capture node 400 has a capture device 404 comprising a video camera. The camera may be fixed or may have point, tilt, and zoom capability and may provide a video stream of a target area. Pan, tilt, and zoom cameras may be moved to focus on different areas as desired or according to a predetermined surveillance plan. In addition, such a capture node 400 may be programmed to automatically focus its camera (or other capture device) on an area in response to an event or notification or be remotely controlled such as through an external device or node in communication with the capture node 400.

In one or more embodiments, a capture node 400 may compress the surveillance information it is transmitting such as to save storage space, to save bandwidth for multiple streams of information, or to allow transmission of data across low bandwidth communication links. In one embodiment, a capture device 404 sends surveillance information to a processor 304 in the capture node 400. It is noted that the processor 304 may process the surveillance information in a number of ways. For example, the processor 304 may analyze the information, as will be discussed further below, or may compress the information.

In one or more embodiments, compression may occur through a compression algorithm or software comprising machine readable code stored on the memory 308, storage 312, or both. Any compression algorithm, now known or later developed, that can be executed by the processor 304 may be used. Some examples of compression algorithms for various types of data include: H.261, H.264, G.711, ZIP, LZIW, JPG, MPEG-1, MPEG-2, and MPEG-4. It is noted that the compression algorithm used will depend on the type of information to be compressed and the desired data rate, quality, or both of surveillance information after compression.

With regard to video surveillance, compression/decompression algorithms or software known as a video codec, may be used to accept analog video and then digitize, compress, and packetize it so it may be sent to its destination. Video compression and decompression requires significant hardware and software capabilities. In a worst case situation, where a video scene has simultaneous background and foreground scene complexity (e.g. shapes and patterns that are dissimilar in color, texture, shape, hue, etc. . . . ) and simultaneous 3-axis camera movement (e.g. pan, tilt and zoom all at the same time), along with 3-axis target movement (e.g. a suspect or vehicle moving at or away from the camera at a diagonal), the codec may be required to process as much as 6,400,000,000 instruction sets per second or more. Traditional security industry codecs will drop frames or produce DCT (Discrete Cosine Transfer) blockiness, or both, when subjected to such harsh conditions because traditional codec simply cannot process the instructions quickly enough.

Furthermore, conversion from analog to digital is done in "real time" where massive amounts of analog data are converted to digital in real time. If the information cannot be processed quickly enough, some of the data is thrown away (e.g. dropped frames) during the compression process. The difference between the theoretical real time transformation and the actual transformation (the time delta) is called latency. A respectable latency (from the capture of video to its subsequent viewing) for 4 CIF images at 30 frames per second is under 180 milliseconds. If compression drops frames or introduces blockiness, the surveillance information is largely worthless.

Thus, in one or more embodiments, a capture node 400 may include an ASIC (Application Specific Integrated Circuit) to meet the video compression requirements defined above. For example one or some of the processors 304 of a capture node 400 may be ASICs designed to compress video according to one or more types of compression as discussed above. For example, the ASIC may compress (and/or decompress) video according to one or more video codecs. It is contemplated that video and other surveillance information may be compressed and decompressed through one or more ASICs and that other nodes, besides capture nodes 400, may utilize ASICs in one or more embodiments. It is contemplated that compression and/or decompression of surveillance information may be performed, as described herein, on any node of the peer to peer surveillance architecture.

Each capture node 400 may transmit multiple streams of video or other surveillance information, and each stream's network utilization may be managed differently. For example, a capture node 400 may set a first stream to 1 Mbps and UDP multicast, a second stream may be set for 256 kbps and unicast, and so on. The network utilization of each stream of surveillance information may be set based on network capabilities (e.g. available bandwidth) or other conditions such as the monetary cost of transmitting surveillance information over particular communication links. It is noted that other nodes 100 of the peer to peer surveillance architecture may transmit multiple streams of surveillance information as well.

In some embodiments, the capture node 400 may be configured to store captured surveillance information in addition to or instead of transmitting it. The surveillance information may be compressed prior to its storage and may be written to the capture node's 400 storage 312, such as magnetic, optical, or flash media, if desired. Various forms of storage 312 may be utilized as will be described further with regard to the content storage nodes of the invention. A capture node 400 may transmit live surveillance information, stored surveillance information, or both alone or simultaneously, if desired.

It is contemplated that capture nodes 400 may be configured to analyze surveillance information and provide one or more notifications if a particular event is detected. For example, a capture node 400 may be configured to execute analysis software. This software may execute on one or more processors 304 of the capture node 400. Analysis of surveillance information and notifications are described further below with regard to the server nodes of the invention.

In one embodiment, the capture node 400 may be a cellular node. In this embodiment, at least one transceiver 320 is configured to communicate through a cellular communication link or network. Cellular connections may have reduced or limited bandwidth and thus compression may be used to compress surveillance information before it is transmitted. Of course, where there is sufficient bandwidth, uncompressed surveillance information may be transmitted.

Video surveillance information from will generally be compressed prior to transmission over a cellular connection due to its higher bandwidth requirements. As stated above, video compression may require significant processing power to provide video with a high frame rate, no artifacts, and no dropped frames. This is especially so on reduced bandwidth connections such as cellular connections. Thus, though not required in all embodiments, it is contemplated that a cellular capture node 400 or other node having a cellular transceiver may include an ASIC configured to compress video suitable for transmission over a cellular connection.

It is noted that a cellular transceiver 320 may communicate to other nodes 100 through the virtual matrix switch described above if desired. Thus, captured surveillance information may be unicast, multicast, or broadcast to other nodes 100 through a cellular connection. This is advantageous in a cellular connection (or other reduced bandwidth connections) because multicast or broadcast transmissions allow multiple or all the nodes 100 to receive the same surveillance information from a single transmission stream.

A cellular capture node 400, or other node having a cellular transceiver, also has the advantage of being capable of having network connectivity in remote locations because its cellular transceiver 320 may communicate over long distances wirelessly. Thus, it is contemplated that some embodiments of a cellular node may include one or more power sources 316 to allow the cellular capture node to operate without any wired connections. The cellular node may then be quickly and easily deployed nearly anywhere by simply placing it where it can capture surveillance information from one or more desired target areas.

Figure 5:
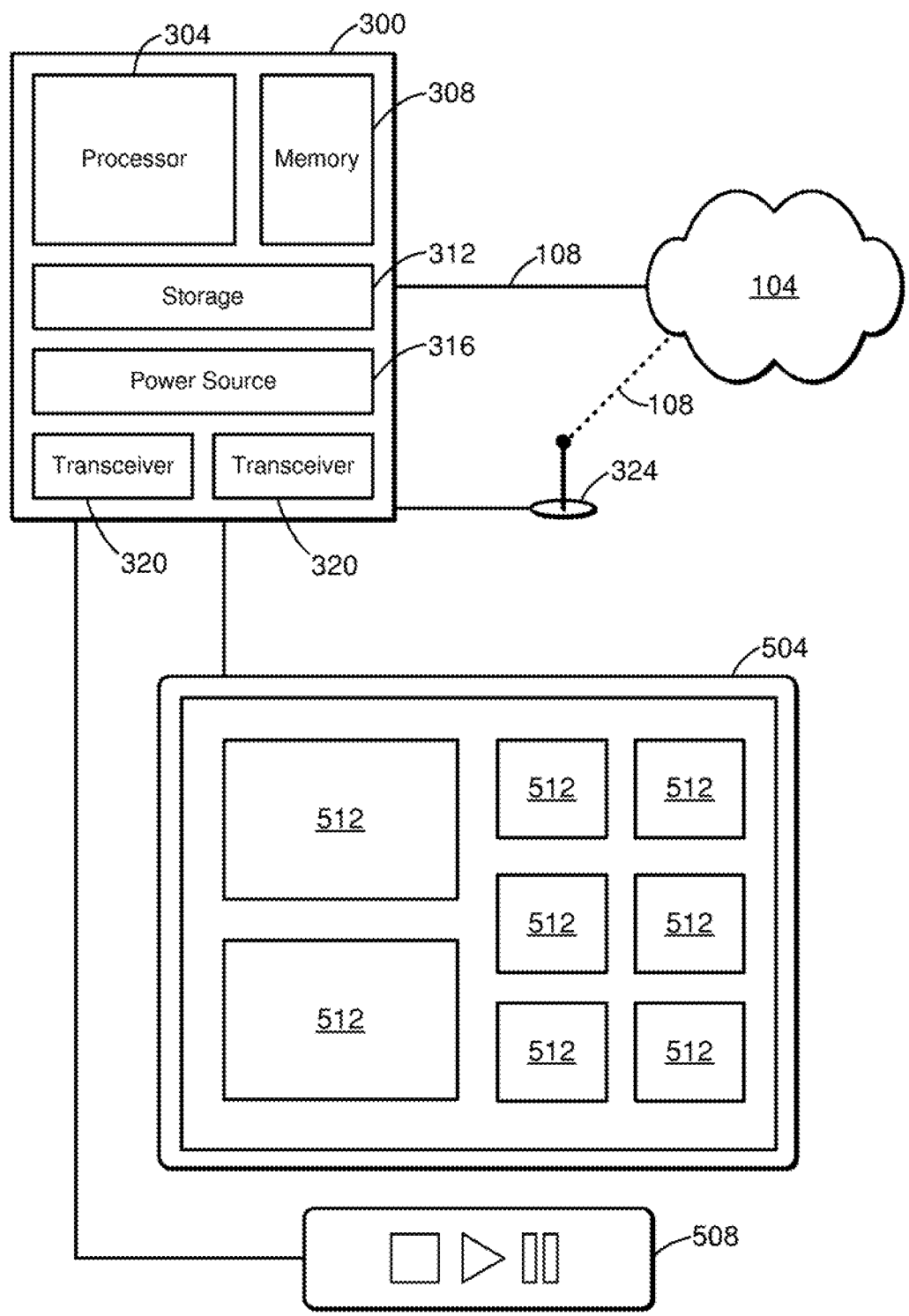
FIG. 5 is a block diagram illustrating an example embodiment of a viewing node.

FIG. 5 illustrates an embodiment of a viewing node 500. Generally, a viewing node 500 is used to view live and stored surveillance information as well as to control playback of live or stored surveillance information. A viewing node 500 may also be used to select the surveillance information to be viewed as well as various representations or arrangements of the surveillance information. For example, the desired live or stored video surveillance from one or more nodes may be selected and viewed on the viewing node 500. In addition, the viewing node 500 may display other surveillance information in a table, graph, pie chart, text, or other arrangement.

It is contemplated that a viewing node 500 may also display or emit various alarms or warnings. For example, audible warnings, email alerts, and notifications of network or capture node failures may be presented visually or audibly via a viewing node 500. These alarms or warnings may result from one or more notifications transmitted by other nodes 100, as described below, and received by the viewing node 500.

In one or more embodiments, a viewing node 500 may comprise a processor 304, memory 308, storage 312, power source 316, one or more transceivers 320, one or more antenna 324, or various combinations thereof as described above. In addition, the viewing node 500 is a node and thus may comprise any configuration described above with regard to FIG. 3. A viewing node 500 may include one or more screens 504, control interfaces 508, or both as components in one or more embodiments. It is contemplated that a viewing node may be a personal computer (PC), smart phone (e.g. BlackBerry, iPhone), or personal media player in one or more embodiments. As these devices are nearly ubiquitous, a further advantage of the invention is that surveillance information from any node may be viewed virtually anywhere.

The screen 504 may be a high resolution color display such as a computer monitor or LCD screen. Any type of screen 504 may be used with the viewing node 500. This includes but is not limited to television monitors, black and white monitors, plasma and LCD screens, and projectors.

In some embodiments, surveillance information from other nodes 100 is displayed on a screen 504 in a viewing pane 512 comprising a portion of the screen. As stated, the nodes 100 may be various combinations of capture, server, storage, and other nodes described herein. It is contemplated that there may be one or more viewing panes 512 displayed on a screen 504 and that each viewing pane 512 may display surveillance information from one or more nodes 100). A user may be provided a list of nodes 100 and be allowed to select which node or nodes he or she wishes to view.

In one embodiment, the viewing panes 512 are displayed in various layouts such as 2×2, 3×3, 4×4, and 5×5. In other embodiments, the viewing panes 512 may be displayed according to a custom layout, such as shown in FIG. 5. For example, important viewing panes 512 may be displayed larger than other viewing panes. The viewing panes 512 to view may be selected from a list, map, or hierarchy of all available viewing panes. In addition, viewing panes 512 may be assigned to one or more groups and entire groups of viewing panes may be selected for viewing simply by selecting the desired group. This may be used to view surveillance information from an entire site or salvo of nodes 100.

In one or more embodiments, surveillance information will be received by the viewing node 500 through one or more transceivers 320 connected to one or more communication links 108. It is noted that each viewing node 500 may also transmit data such as to initiate communications with other nodes 100, request surveillance information, and control capture node cameras or other capture devices. The viewing node 500 may also output or export surveillance information so that it may be recorded by an external device. For example, video surveillance information may be exported to a video file, or may be output to a VCR, DVD, or other recording device or media for recording. It is contemplated that surveillance information may be exported to industry standard formats and be watermarked or signed to ensure its authenticity. Other nodes may also export surveillance information.

As stated, surveillance information may be uncompressed or compressed. Where the surveillance information is compressed, the viewing node 500 may decompress the surveillance information before it is viewed. This may occur by the processor 304 executing one or more decompression algorithms on the incoming surveillance information.

Of course, the proper decompression algorithm must be determined and such determination may occur by a handshake communication where one node notifies another of the algorithm it is using to compress information. The proper algorithm may also be determined by a node analyzing the incoming surveillance information. In some embodiments, a node may present the compression types it is capable of decompressing and the source node may select a compression algorithm accordingly. In essence, nodes may agree on which compression algorithm to use. It is contemplated that the communication of any type of surveillance information between any nodes of the peer to peer surveillance architecture may be facilitated by the handshake communication.

In addition to viewing panes 512, a viewing node 500 may display surveillance information on a timeline. In this manner, surveillance information is generally displayed according to the time it was captured or recorded. The timeline may have a resolution from one second to one month, but this range of resolution may be increased or decreased in one or more embodiments. The timeline provides the advantage of allowing surveillance information to be viewed together with the time it was capture or corresponding to other times. In this manner, more than one stream or type of surveillance information may be viewed such that any surveillance information for a particular time may be viewed together. For example, a video may be viewed synchronized with telemetry information, audio, or even other video. The timeline may be scrolled across the screen 504, or set to a specific start time, end time, or both.

In one or more embodiments, a viewing node 500 may include one or more control interface 508. A control interface 508 has the advantage of specific buttons, switches, or other controls not commonly found on a keyboard or mouse. In one embodiment, a control interface 508 may have media player type controls such as play, pause, fast forward, rewind, single frame advance or reverse, slow motion forward or reverse play, and stop. In addition a jog shuttle may be provided in some embodiments. The jog shuttle may be a circular knob which, when turned, allows fine control of the speed of the forward or reverse playback of surveillance information.

The playback or display of surveillance information on each viewing pane 512 may be individually controlled by the control interface 508. In addition, the controls may be used to control other aspects of viewing such as the volume of audio, or the magnification (i.e. zoom) of video. In one or more embodiments, signals comprising instructions to control the display of surveillance information, are generated from the operation of the control interface 508 and received by control interface's attached node.

In one embodiment, one or more of the viewing panes 512 is used to view video surveillance information. In this embodiment, available video surveillance information may be selected for viewing. The video surveillance information may be listed for selection with a text or other label, a thumbnail, or both. Each list item corresponds to the surveillance information provided by a particular node 100 or nodes. For example, a list item labeled "Building 10 Northeast Corner" may correspond to a capture or other node on the northeast corner of Building 10. Based on this, a user may then choose one or more videos for viewing as he or she desires. It is noted that other types of surveillance information may be similarly listed for selection with a text or other label, thumbnail, summary, or combination thereof.

In one or more embodiments, a viewing node 500 may be configured to store the last 30 seconds of surveillance information received by the viewing node on its storage 312, memory 308, or both. For example, the last 30 seconds of live video surveillance may be stored so that a user may easily review the last 30 seconds of events. In some embodiments, this storage of video or other surveillance information is temporary and may be more or less than 30 seconds if desired.

Figure 6:
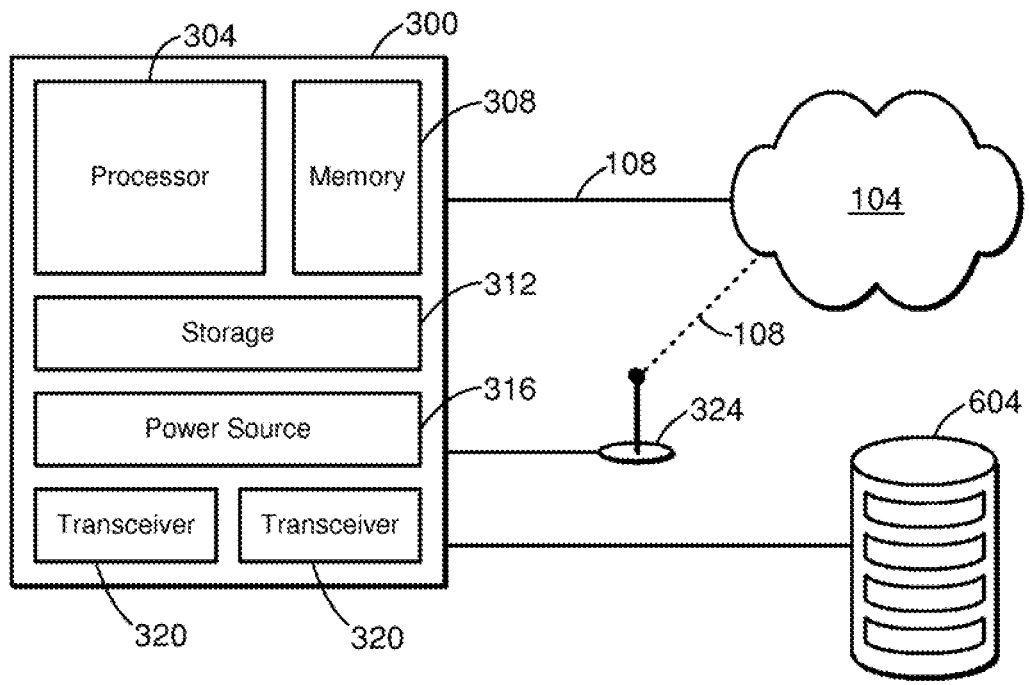
FIG. 6 is a block diagram illustrating an example embodiment of a content storage node.

FIG. 6 illustrates an embodiment of a content storage node 600. Generally, a content storage node 600 is configured to store surveillance information captured or transmitted from other nodes 100, and to transmit stored surveillance information to other nodes. These other nodes 100 may be any type of node including but not limited to capture nodes, viewing nodes, or even other storage nodes.

In one or more embodiments, a content storage node 600 may comprise a processor 304, memory 308, storage 312, power source 316, one or more transceivers 320, one or more antenna 324, or various combinations thereof as described above. Generally, content storage nodes 600 will include storage 312 to store the surveillance information received from other nodes 100.

The storage 312 in one or more embodiments is one or more hard drives. The hard drives may be configured in a RAID configuration, such as RAID 1 or RAID 5, in one or more embodiments. Of course various forms of storage 312 may be used. For example, the storage 312 may be internal or removable optical, magnetic, or flash media. In some embodiments, the storage 312 may be written to only once such as with DVD-R or CD-R technology. In other embodiments, the storage 312 may allow repeated reading and writing such as with a hard drive or other magnetic media.

It is contemplated that the content storage node 600 may access additional storage such as an external or remote storage device 604.

A content storage node 600 is capable of storing both compressed and uncompressed surveillance information. For example, the content storage node 600 may receive compressed video from another node 100. Where compressed surveillance information is received it may be directly stored or, if desired, the content storage node 600 may decompress the information before it is stored. In addition, uncompressed surveillance information received by the content storage node 600 may be directly stored or compressed before it is stored. Compression will generally occur through one or more compression or decompression algorithms executed on the processor 304 as described herein. In addition, content storage nodes 600 may also go through a handshaking process with other nodes as described above. In this manner, the content storage nodes 600 may agree upon a compression/decompression algorithm for a particular transmission of surveillance information.

A content storage node 600 may be configured to transmit stored surveillance information in one or more embodiments. Surveillance information may be transmitted in compressed or uncompressed form regardless of how it has been stored. In addition, it is contemplated that surveillance information stored according to one type of compression may be recompressed with another type of compression prior to its transmission. This is advantageous in that it allows surveillance information to be compressed with another type of compression that may have reduced bandwidth requirements. In addition, some nodes may not support all compression types. Thus, the content storage node 600 may recompress surveillance information according to a compression type supported by the nodes it is communicating with. Of course, compressed surveillance information may be decompressed and transmitted as uncompressed surveillance information.

One advantage of a content storage node 600 is that surveillance information may be stored in multiple physical locations. For example, a capture node may transmit surveillance information to a plurality of content storage nodes 600 in various locations. In this manner, the surveillance information is preserved even if one or more of the content storage nodes 600 is damaged or destroyed. Similarly, surveillance information may be retrieved from multiple physical locations. For example, if connectivity to a geographic region, building, office, or other physical location is reduced or unavailable, the desired surveillance information may be retrieved from a content storage node 600 in a different physical location.

Figure 7:
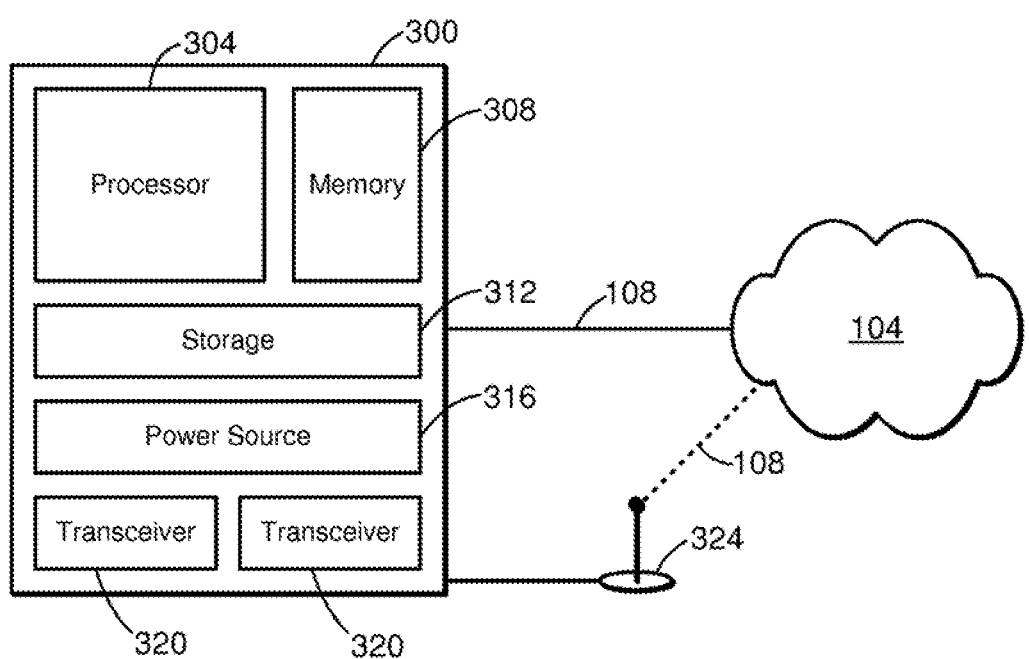
FIG. 7 is a block diagram illustrating an example embodiment of a server node.

FIG. 7 illustrates an embodiment of a server node 700. Generally, a server node 700 is configured to provide services related to authenticating access to and analyzing surveillance information. The server node 700 may be configured to authenticate requests for or access to surveillance information, analyze live or stored surveillance information, or both.

In one or more embodiments, a server node 700 may comprise a processor 304, memory 308, storage 312, power source 316, one or more transceivers 320, one or more antenna 324, or various combinations thereof as described above. In addition, the server node 700 is a node and thus may comprise any configuration described above with regard to FIG. 3.

In one embodiment, the server node 700 provides authentication capability. The server node 700 may use commercial software to accomplish this, such as Active Directory authentication in Microsoft Windows. Of course, the server node 700 does not have to utilize Active Directory as it is contemplated that any system, now known or later developed, where one or more user or other access accounts may be managed and authenticated through one or more server nodes 700 may be used with the invention.

In a peer to peer configuration, the server node 700 may validate a user's or a device's credentials and allow or deny access to the peer to peer surveillance architecture accordingly. In one or more embodiments, this may occur by the server node 700 returning a key or code which allows access to other nodes 100 of the surveillance architecture. Each node may be configured to respond only to one or more particular keys. It is contemplated that, in one or more embodiments, the keys may be generated through use of digital signatures, encryption, hashing algorithms, or both, now known or later developed, such as in a public key infrastructure.

The server node 700 may also be used to manage user or other access accounts such as by assigning access privileges or restrictions to a user other account or to a group of accounts. The privileges or restrictions may be set on the server node 700 to vary depending on the particular node 100 or group of nodes being accessed.

In embodiments of the peer to peer surveillance architecture where authentication is required for access, it is contemplated that a plurality of server nodes 700 providing authentication services may be used for redundancy. These server nodes 700 may be deployed in different physical locations to increase reliability as described above. It is contemplated that changes to user or other accounts may occur through any server node 700 which then may update other server nodes within the surveillance architecture accordingly.

In one embodiment each node 100 may be configured with one or more access codes or usernames and passwords which allow access to a node if correctly presented to the node. This embodiment does not require a server node 700 as each node 100 may authenticate access requests itself. One or more server nodes 700 may be utilized to manage user or other access accounts for each node 100 in this embodiment however.

One advantage of authentication is that each user or device may have their own accounts. This allows different access levels depending on the user or device and prevents the entire peer to peer surveillance architecture from being compromised if one or more access codes are revealed. Access codes may be changed as desired to further enhance the security of the surveillance architecture. Though this may be implemented at each node 100, use of one or more server nodes 700 providing authentication services has several advantages. One advantage is that accounts and access codes may be created, modified, or deleted at any server node 700. Each server node 700 may synchronize account and access code information to provide full redundancy for the authentication services.

Another advantage is that the server nodes 700 may be configured to log and audit access requests or other authentication activities. All user and system activity may be collected in the audit log along with the time at which the activity occurred. For example, a user's viewing of live or recorded surveillance information may be logged in the audit log. In this manner, a security audit may be performed on the peer to peer surveillance architecture to ensure its integrity. The audit log may be mirrored or copied to other server nodes 700, content storage nodes, or other nodes having storage for redundancy.

Server node based authentication is particularly useful in large surveillance architectures, such as city-wide surveillance architectures with hundreds to thousands of users and nodes. Managing access to individual nodes 100 may occur at each node, such as by setting up user or device accounts on each node. However, it is much easier to manage access to the nodes 100, especially in large surveillance architectures, from the one or more server nodes 700.

In one or more embodiments, a server node 700 may be configured to provide analysis of surveillance information it receives. This analysis will generally be performed through analysis software or machine readable code executing on one or more processors 304. With regard to video surveillance information, a server node 700 may accept an incoming video stream to detect one or more events such as by analyzing the video to detect or recognize motion, images or particular events. In addition, the server node 700 may have software capable of creating virtual tripwires, detecting objects that have been left behind by one or more subjects. Any analysis software may be used, and thus a variety of analysis may be performed including license plate and facial recognition. Software requiring specific video formats may be utilized as well because the server node 700 may request video of a specific format, such as a specific video format or compression type, from the other nodes 100. In addition, it is contemplated that the server node 700 may convert incoming video to a format usable by the analysis software if necessary.

The server nodes 700 may also provide analysis of other surveillance information to detect particular events therein. For example, weather information may be collected by various capture nodes and analyzed to track temperatures, wind speed, humidity, or other data for a geographic area. Each server node 7X) may be configured to perform one or more analysis services of other server nodes 700. In this way, redundancy is provided for any analysis service used by the peer to peer surveillance architecture. In addition, one or more server nodes 700 may work together to analyze a particular stream or set of surveillance information. The results of the analysis of surveillance information may be stored on the server node 700, content storage nodes, or even other nodes.

In one or more embodiments, users may setup triggers which are activated when particular events are detected. For example, one or more server nodes 700 may be configured to notify one or more users when a particular event is detected. Notification may occur by email, phone, text messaging, on screen dialogs, sounds, or other methods. It is noted that each server node 700 may provide different analysis services and have different triggers and notification settings. One or more content storage nodes may be configured with analysis, triggering, and notification capabilities as well, in one or more embodiments.

In addition to notifying users, other nodes may be notified when particular events occur. For example, capture nodes with cameras may be notified to zoom in or focus on an area when a virtual tripwire is tripped or when a particular event is detected. Notification of another node may occur by one node communicating a notification message including information regarding an event to another node. The detection of an event includes recognizing animate or inanimate objects and may trigger further analysis by the same or one or more other server nodes 700. It is noted that any node may provide notification, such as for example, a node providing a notification of a communication link failure, or hardware or software failure.

It is contemplated that the peer to peer surveillance architecture may include one or more hybrid nodes in some embodiments. A hybrid node may combine components of the types of nodes described above. For example, in one embodiment, a capture node may include storage as described with regard to a content storage node, or vice versa. In other embodiments, the capture node may include a screen for viewing captured surveillance information, or may provide authentication services, analysis services, or both. In yet another embodiment, a viewing node may be configured to provide analysis services. The above listing of exemplary hybrid nodes is not intended to be exhaustive or limiting, as a wide variety of hybrid nodes may be formed from the components of the nodes disclosed herein.

As stated, peer to peer means that each node within the surveillance architecture operates independent from (i.e. does not rely on) its peer nodes. In traditional surveillance systems, a central control device or controller aggregates incoming surveillance information and, if so configured, also sends control instructions to its connected capture devices. This creates a single point of failure because each capture device relies on a single central controller in order to function. This also limits the number of capture devices and simultaneous users to the capacity of the control device. In contrast, the peer to peer surveillance architecture does not rely on any central control device as each node is independent.

To illustrate, failure to receive video surveillance from a surveillance camera can be due to various causes. For example, the cable from the camera may be damaged, the device receiving video surveillance may malfunction, or the camera itself may be malfunctioning. In a traditional system with central control, any one of these problems prevents the capture and use of surveillance information because the central controller is not receiving any surveillance information.

With the invention herein: where there is a damaged cable, a capture node may utilize one or more redundant communication links; where a viewing node is malfunctioning, a user may simply use another viewing node; and where the capture node is malfunctioning a redundant capture node at the same location may be used. As stated, a viewing node may be a PC, smart phone, or personal media player in one or more embodiments, and thus, switching to another viewing node is easily accomplished within the peer to peer surveillance architecture.

Furthermore, capture nodes may store the surveillance information they capture or transmit to other nodes for analysis, storage or both. Thus, in the unlikely event that a user cannot view surveillance information through a viewing node, the captured surveillance information is not lost. Though the user is temporarily unable to view the surveillance information, he or she may still be notified by one or more server nodes analyzing the information for particular occurrences, and the information may be stored for later review by the user.

It is noted again that, users and viewing nodes (and any other node) may be in different geographic locations and use more than one completely independent network to communicate. Thus, the failure of a cable or even an entire network in one or more locations does not prevent the peer to peer surveillance architecture from operating. For example, a single node may have a cable Internet connection, a cellular connection, and an ISDN connection.

The nodes themselves may have redundant components. For example, a capture node may have more than one camera or other capture device, or a content storage node may be configured with a RAID storage array. It is contemplated that a node may be configured such that each component has a backup or redundant counterpart. Such redundancy is not available in traditional systems.

A highly available surveillance system includes devices that have a high Mean Time Between Failure (MTBF), and Mean Time Between Critical Failure (MTBCF). As discussed above, the peer to peer relationship between nodes ensures no loss of service during a node, communication, or network failure. However, after a failure and until the failed node, communication link, or network is fully operational the peer to peer surveillance architecture may be operating under less than optimal conditions. For example, redundant communication links may have less bandwidth and more latency, or be more expensive. Also, where there already has been a failure, an additional failure may result in loss of surveillance capability. Thus, the peer to peer surveillance architecture provides another advantage in that it has a low Mean Time To Repair (MTTR) in one or more embodiments.

As an initial matter, the nodes themselves may be configured with components having a high MTBF and MTBCF to reduce failures and the need for repairs. Various node configurations, protective components, and enclosures may be used to protect node components from environmental threats which may lower a component's MTBF or MTBCF, such as high or low temperatures, power surges, lightning, and humidity.

In addition, nodes may be configured to allow access by qualified technical or other personnel. This access to a node is highly advantageous in maintaining and repairing individual nodes. In one or more embodiments, operating information including information regarding hardware and software abnormalities or failures may be stored by the nodes. This information can be used to prevent node failures, such as by allowing preventative maintenance to occur, as well as to optimize node performance. It is contemplated that the nodes may have internal diagnostics and may allow technicians or other personnel to access operating information, change hardware or software settings, or run diagnostics through a diagnostic connection with the node. The diagnostic connection may be authenticated and occur through one or more communication links, networks, or a combination thereof as discussed above.

The diagnostic connection allows quick diagnosis over a remote or direct connection to reduce a node's MTTR. Repairs, such as changing hardware or software settings may be implemented through the diagnostic connection as well. Where replacement hardware is necessary, the diagnostic connection may be used to quickly identify what hardware to be replaced.

It is noted that, because the nodes are independent, a repair may occur simply by replacing a damaged node with a new one. While the new node is in place, the damaged node may be diagnosed and repaired. It is contemplated that configuration settings for a node may be saved external to the node or exported from the node and imported into a similarly configured node to allow for rapid replacement of individual nodes.

In one or more embodiments, diagnosis of software or hardware issues may occur through one or more diagnostic routines or programs. Generally, these routines or programs input data into one or more of a node's components and confirm that the corresponding output from the components is as expected or within an acceptable range for a properly functioning component.

The peer to peer surveillance architecture has another advantage in that maintenance updates or upgrades may be performed without impacting the overall surveillance architecture. This is because each node may be individually updated or upgraded without interrupting the operation of any other node. It is noted that, in contrast to an unplanned failure, updates and upgrades may be planned in advance so as to occur when operation of a particular node is not crucial. Updates include firmware or other software updates for a node's components, and may include replacement of components with new revisions of the same. Upgrades generally may be thought of as software or hardware replacements that increase the node's or a particular component's capabilities or capacity, reduce power consumption, or provide other benefits.

It is noted that the invention herein is a peer to peer surveillance architecture. Though each node, regardless of its type, functions independently of its peer nodes, each type of node (except hybrid nodes) is necessary to provide the full functionality of the surveillance architecture according to the invention herein. Thus, each node may function independent of any other node, however, the full functionality of the invention may not be realized by any single node acting alone.

It is contemplated that surveillance may be enhanced by including detection and response capabilities, as will be described further below. In one or more embodiments, these capabilities may be included as part of the surveillance architecture, such as in one or more nodes or other hardware or software associated with the surveillance architecture. It will be understood that the detection and response capabilities herein may be implemented, embodied, or used in various types of surveillance systems, software, or hardware.

In general, the detection and response capabilities comprise detection of one or more events and one or more responses to the detected event(s). Typically, the type or selection of responses will be based, or in some cases defined, by the event(s) detected. For instance, one response may occur as a result of a particular event being detected, while another response may occur as the result of detection of a different event.

Events may be a variety of occurrences detectable by a surveillance system, which indicate something desirable or undesirable is occurring, has occurred, or will occur. Typically, events will be related to security, health and safety, and law enforcement. For example, an event may be the tripping of a virtual or other tripwire, engagement or disengagement of a contact switch, human or other motion, or particular weather or environmental conditions. However, as stated, events may be a variety of occurrences detectable by a surveillance system.

Some exemplary events include, gunshots, alarm activations, tripwire activations, recognition of an individual's face, detection of a license plate, receipt of a telephone call, movement of a GPS tracking device, receipt of a particular caller ID, receipt of a text message, movement of an object or person, detection of an RFID transponder, change in an object's, person's or environment's conditions (e.g., temperature, humidity, moisture, etc. . . . ), receipt or placing of a 911 or other emergency call, among others. It is contemplated that any occurrence that may be captured by a device, such as a capture device or capture node, may constitute an event.

As will be described, responses may be a variety of actions taken by the surveillance system as the result of a detected event. For example, in one or more embodiments, a response may be to control or direct a camera to focus on or point towards a particular target area relevant to the event, such as the area where the event is occurring. Of course, other responses may be made such as one or more alarms, warnings, or notifications like those described above.

As will become apparent from the discussion below, automated responses are highly beneficial. In a law enforcement setting for example, automated camera or other responses to events can greatly reduce crime by capturing relevant video or other surveillance information immediately after an event of interest has been detected. This is especially so with the detection and response capabilities herein because they also provide surveillance that is highly relevant to the event. This greatly enhances the effectiveness of law enforcement in areas covered by the detection and response device described herein. When it becomes known that crime is difficult to get away with in a certain area, the crime in that area is typically reduced by substantial amounts.

Figure 8:
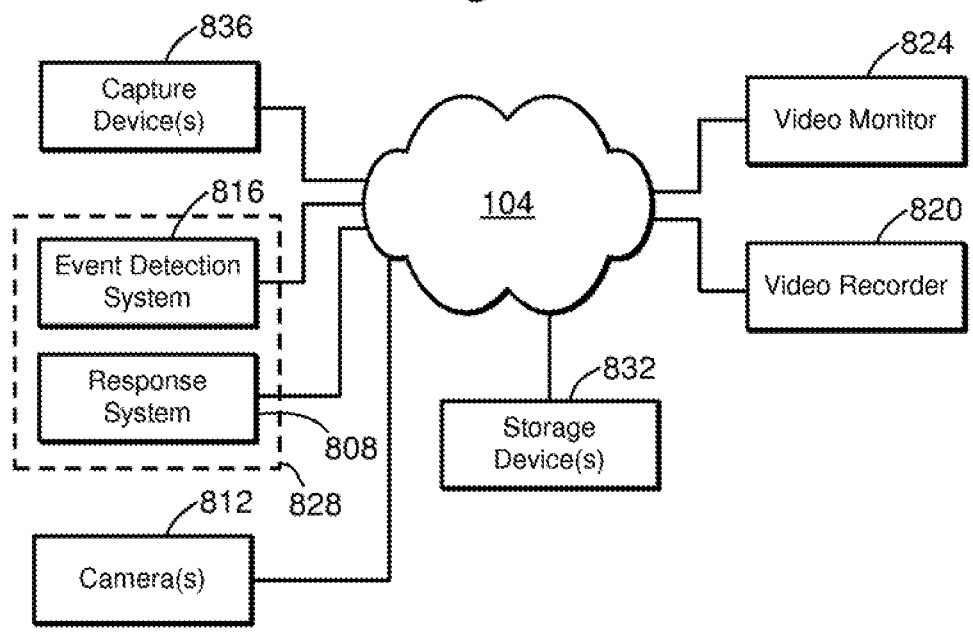
FIG. 8 is a block diagram illustrating an example detection and response device.

Typically, event detection and responses thereto will be performed by one or more surveillance systems, devices, or software. For example, surveillance hardware, software, or both may detect events and respond to the events. FIG. 8 illustrates an exemplary surveillance system having detection and response capabilities. As stated, these capabilities may be provided by one or more surveillance systems in some embodiments. For example, in one embodiment, one surveillance system may be used to detect events while another surveillance system is used to respond to the events.

FIG. 8 illustrates an exemplary embodiment where a detection and response device 828, one or more capture devices 836, and one or more cameras 812 are connected via one or more networks 104 or other communications systems and one or more communications links 108. The network may be various types of communications networks, including one or more wide area networks which allow components of the surveillance system to communicate across vast distances, as described above. It is contemplated that these elements may be directly connected as well. For instance, a capture device 836 and/or camera 812 may be directly connected to the detection and response device.

As can be seen, the detection and response device 828 may comprise an event detection system 816 and a response system 808 which will now be described. In one or more embodiments, the event detection system 816 may be configured to detect one or more events, determine their location, and communicate the location of the events to a response system 808. Generally speaking, the event detection system will typically receive input data to perform its event detection functions. The input data may come from virtually any source. For example, the event detection system 816 may receive surveillance information of various sorts from one or more capture nodes, capture devices, sensors, detectors, or the like. As will be described further below, the detection system 816 may include or utilize a converter component to translate received input to a format usable by the system.

In some embodiments, the event detection system 816 may be configured to determine if and/or where an "event" has occurred. For example, the event detection system 816 may be configured to process input data and determine whether the data indicates that an event has occurred. To illustrate, the event detection system 816 may analyze a video stream to determine if a virtual tripwire (such as described above) has been tripped. The event detection system 816 may use the location of the device providing the video stream to determine the location of the event.

A variety of "source" devices may be deployed to provide input data to the event detection system 816. For example, FIG. 8 shows that one or more capture devices 836 may provide input to the event detection system 816 via a network 104. It is contemplated that a capture device 836 may be directly connected to the event detection system 816 in some embodiments. A capture device 836 may be part of a capture node, such as described above, or may be another type of surveillance equipment configured to record surveillance information.

In one example, a gunshot, explosion, detonation, or the like may be captured by one or more capture devices 836. In this example, the capture devices 836 may be an array or set of one or more microphones used to listen for gunshots. The event detection system 816 may receive sound captured by the microphones to detect a gunshot and to determine where the gunshot occurred. For example, as is known, the event detection system 816 may process sounds from one or more of the microphones to determine the location of a gunshot, such as be comparing the time at which the microphones "heard" the gunshot.

Alternatively or in addition to determining if/where an event has occurred, the event detection system 816 may receive information indicating that an event has occurred. In other words, another device, such as a capture device 836 may determine an event has occurred and notify the event detection system 816 of such event. For example, the event detection system 816 may be connected to a silent alarm or other alarm such that the event detection system can detect when the alarm is tripped. The event detection system 816 may be programmed with information indicating the location of the alarm, or the alarm system itself may communicate its location to the event detection system. As another example, an independent gunshot detection system may report the occurrence and location of one or more gunshots to the event detection system 816 (rather than the event detection system detecting such events itself).

Once an event has been detected, the event detection system 816 may transmit information related to the event to the response system 808. The response system 808 may then generate a response to the event. In general, the response system 808 receives such input or information from the event detection system 816, processes the input, and causes a response to the event occur accordingly. For example, in one embodiment, the response system 808 may receive location information identifying the location of one or more gunshots (or other events) and cause a response to be made. One exemplary response may be to point or focus one or more cameras 812 on the location of a gunshot (or other event).

Sound, images, video, or a combination thereof from the cameras 812 may then be viewed or recorded such as by one or more video recording devices 820 or monitoring devices 824. The recording or presentation of camera sound, images, or video may be part of the response. In other words, the response system 808 may cause recording or presentation of an event to begin as a result of the event's detection. It can be seen that this is highly beneficial in that it provides a near instantaneous view of the event's location which may also be recorded for later review.

As will be described further below, the response system 808 may determine which one or more of the cameras 812 may be used to capture an event. Typically, the selection of the appropriate device will be based on the location of the event and the capabilities of the device (at its present location). For example, a particular camera 812 may be instructed to point at or focus on an event that occurs near the camera or is within the camera's visual range.

It is contemplated that mobile cameras, such as handheld cameras or cameras in law enforcement or other vehicles, may also be used by the response system 808. The mobile cameras may provide updated location information to the response system 808 to allow the response system to determine whether a particular mobile camera is capable of viewing a detected event. In one embodiment, generation of camera behavior may be simplified such as through a user interface. For example, graphical user interface which establishes GPS coordinate boundaries for obstructions for novice practitioners to enter enables quick deployment of mobile cameras such as described herein.

Video feeds from cameras of traditional surveillance systems may also be used during a response. For example, such video feeds may be recorded or presented to a user as part of a response to an event. The most relevant or most likely to be relevant video feeds may be selected for viewing or recording as part of a response. This is highly beneficial in eliminating video feeds that may only serve to distract a user from important occurrences related to the event.

It is noted that the response system 808 may be configured to provide a wide range of responses. In fact, since a user may define his or her own responses, the response system 808 may have an almost unlimited variety of responses, as will be described further below. For instance, in addition or instead of moving one or more cameras 812 to focus on an event, the response system 808 may focus one or more capture devices 836 (which may also include cameras) at the event as well. In addition, the response system 808 may instruct a video monitoring device 824 to provide a predefined view of a particular user interface on a screen or display to provide rapid and well laid out surveillance of an event. It is noted that a video monitoring device 824 may be various display or output devices, including the nodes (e.g., viewing nodes) described herein. As will be described below, a video monitor 824 may also collect user input, such as through a touch screen, one or more buttons, or other human interface devices. This input may be used to interact with or control various detection and/or response capabilities.

Figure 9A:
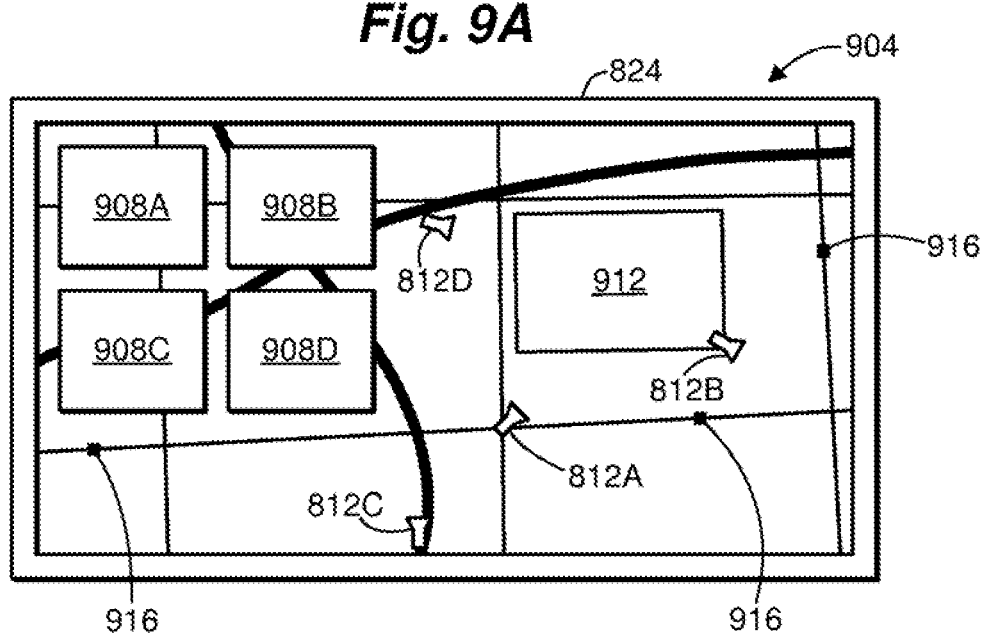
FIGS. 9A-9B illustrate an exemplary predefined view.
Figure 9B:
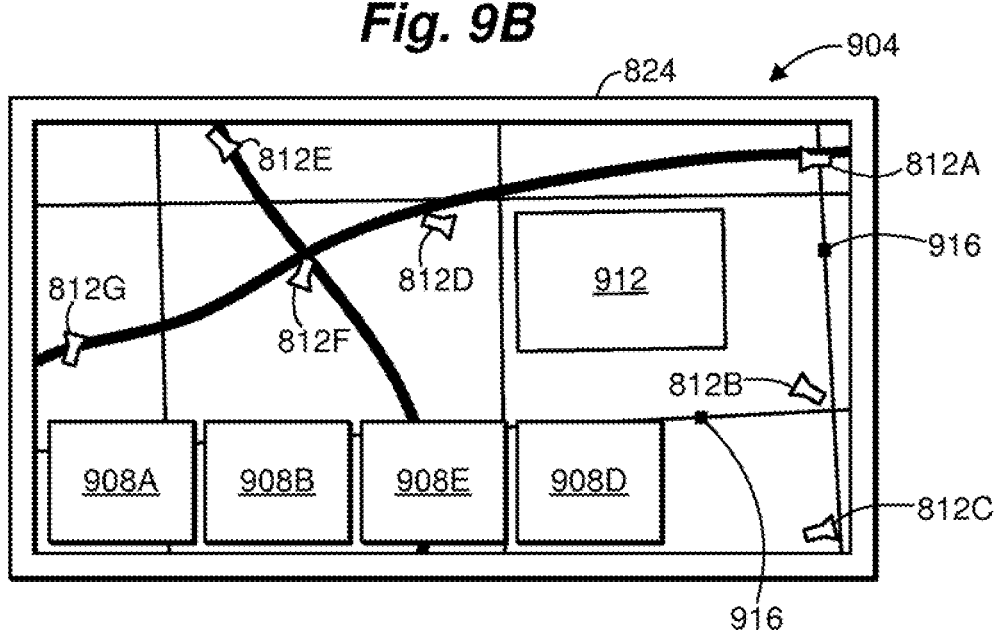

FIGS. 9A-9B illustrate exemplary predefined views 904. The predefined view 904 may be presented on a video monitoring device 824 comprising a screen or display. As can be seen, a predefined view 904 may specify the location of user interface windows 908, their contents, and size. The user interface windows 908 may present one or more video streams or other surveillance information. The location of such streams or information within an interface window 908 may also be specified by a predefined view 904. Though described referring to user interface windows 908, it is noted that various user interface elements may be used. For example, one or more panels, tabs or the like may be used to present video or other surveillance information.

The predefined view may also specify which video stream or streams are displayed in which window 908. For example, in FIG. 9A, interface windows 908A,908B,908C,908D respectively contain video from cameras 812A,812B,812C, 812D at the top left of the predefined view 904. In addition, the user interface windows 908 may contain one or more controls. It is contemplated that a user may provide further instructions to camera(s) or other devices through these controls. For example, a user may zoom in or out or move a camera by using the controls.

A predefined view 904 is highly advantageous to gathering relevant surveillance information. For example, a predefined view may prominently display video streams that are more likely to have relevant surveillance information. To illustrate, a predefined view 904 may be created for a building 912, such as a bank, in which video of the bank's parking area, ingress area, and egress area are prominently displayed by interface windows 908A,908B,908D (which receive video from cameras 812A,812B,812D respectively). A view of a freeway that may be a possible escape route is also provided by interface window 908C and camera 812C. Though not shown, it is contemplated that cameras very remote from the event may also be shown in a predetermined view 904. For example, one or more cameras at a departure and/or arrival airport may be activated and or focused as pan of the response, and viewable via an interface window 908 of a predetermined view 904.

As another example, in FIG. 9B, it can be seen that four interface windows 908 have been provided for video streams from preselected cameras 812. As can be seen, the predefined view 904 may provide interface windows 908 for the most relevant videos streams. The cameras 812 that are likely to capture relevant video may be selected by a user (preferably with expertise in such things) and incorporated into the predefined view 904. In FIG. 9B for instance, the interface windows 908A,908B,909D,908E show video streams from a subset of all the available cameras 812. Ideally, the video stream(s) being automatically shown in the predefined view 904 (i.e., video from cameras 812A,812B, 812D,812E) are those which are likely to capture relevant video. Video from other cameras 812F,812C,812G may also be viewed, such as in an interface window 908, but such video may not automatically be visible because it is less likely to contain relevant video. As can be seen cameras 812F,812C,812G are located or oriented such that they may not capture relevant video from an event occurring at the building 912.

In addition, since a user may become familiar with a particular predefined view 904 and the arrangement of interface windows 908, videos and other surveillance information presented therein, the user may already be aware of where each video stream (or other surveillance information) is coming from, saving time in critical situations. For example, the predefined view 904 may display ingress areas, egress areas, internal areas, and/or parking areas from left to right (or in another preset arrangement) for all buildings 912. This way, the user knows what he or she is looking at when a predefined view 904 of a building 912 is presented. In addition, since the predefined view 904 presents an ideal configuration of user interface windows 908 for the particular event, the user may work more efficiently especially in critical situations.

As can be seen, the predefined view 904 may also provide an overhead view of a geographic area, such as the map shown in FIGS. 9A-9B. It is contemplated that the detection and response device may receive locations of various units 916, personnel, or other users and display them in the predefined view 904 as well. In this manner, the available assets near or at an event may be quickly and easily identified. The detection and response device may be programmed with the characteristics and/or capabilities of the units 916. In addition, as will be described below, the detection and response device may share video or other surveillance information with such units 916 as part of its response to an event or as the result of a user's request to share such video.

A predefined view 904 may be stored on a storage device. In one or more embodiments, a predefined view 904 may be linked to or associated with one or more geospaces 1112 such that the associated predefined view 904 may be retrieved for a particular geospace. The predefined view 904 may comprise one or more user interface settings or values that may be setup by a user. For example, a predefined view 904 may define the number of user interface windows 908, their location, their size, their contents, or various combinations thereof. It is contemplated that the predefined view 904 may also define user preferences such as colors, icon sizes and the like.

Referring back to FIG. 8, in one or more embodiments, the detection and response device 828 may comprise hardware, software, or both. In one embodiment for instance, the detection and response device 828 may comprise one or more processors, memory devices, and transceivers. In such embodiments, the processor(s) may receive input, process the input, and provide an output which generates the desired response to a detected event. The processors may execute one or more instructions, such as machine readable code to perform this function. The instructions may be fixed on a tangible medium, such as a storage device 832 or a memory device. In addition, in some embodiments, some or all the instructions may be hard wired into a processor. The transceiver(s) may be used to communicate data with other devices, such as described above.

It is contemplated that the detection and response device 828 may be a computer running software (i.e. machine readable code fixed on a tangible medium) which provides the event detection and/or response capabilities in some embodiments. The computer may utilize an operating system, such as Windows, Linux, or various UNIX variants, to run the software in one or more embodiments.

In peer to peer embodiments, the detection and response device 828, capture devices 836, cameras 812 or various combinations thereof may comprise one or more nodes, such as those described herein. For example, the detection and response device 828 may be a server node combining the functionality of both the event detection system 816 and the response system 808. In addition, the detection and response device's components, such as its event detection system 816 and response system 808 may themselves be separate nodes or devices. For example, the event detection system 816 and one or more cameras 812 may respectively comprise one or more server nodes and one or more capture nodes (that may capture information besides audio or video), while the response system 808 may comprise one or mores server nodes. Of course, as stated, the detection and response capabilities may be implemented by a variety of software and hardware.

Though shown in singular form, it is contemplated that a plurality of detection and response devices 828 may be provided in some embodiments. Individual detection and response devices 828 may provide detection of different events and provide various responses to the detected events. In addition, each detection and response device 828 may cover different geographic areas (with or without an overlap). In this manner, various types of events may be detected and various responses made at various locations by including additional event detection systems and response systems accordingly. Alternatively, a variety of events and responses thereto may be provided by a single detection and response device 828 in one or more embodiments. Multiple detection and response devices 828 may also be provided for redundancy.

One or more video recording devices 820 or monitoring devices 824, such as illustrated, may be used to view surveillance information gathered by the cameras 812 and the detection and response device 828. For example, in some embodiments, one or more storage nodes or the like may be used to record video while one or more viewing nodes may be used to monitor or watch the video. As shown in FIG. 8, the one or more cameras 812 may output video to the video recording devices 820, video monitoring devices 824, or both via a network 104. Alternatively, video may be transmitted to a detection and response device 828 for distribution to various video monitoring devices 824, video recording devices 820, or other devices.

The cameras 812 may be pan, tilt, zoom or other movable/pointable cameras (such as discussed above) which may be controlled according to information from the detection and response device 828. In addition, the cameras 812 may be video or still cameras and it is contemplated that, in some embodiments, the cameras may capture images in the visible and non-visible spectrum (e.g. infrared). Likewise, other devices, such as capture devices 836, that the response system 808 may control may also be movable or pointable.

A camera 812 or the like may target an area, item, person, event, or other object of interest by moving such that the object is within the camera's field of view. Targeting may also include focusing a lens on the object to provide a clear view of the object. In addition, the camera 812 may target the object by zooming in on the object or zooming out. The actions taken to target the object may depend on the camera's current position or status. For example, the camera 812 need not be moved if the object is already within view, but may adjust its focus and/or zoom if desired.

FIG. 8 also shows that one or more storage devices 832 may be remotely accessible by a detection and response device 828. Alternatively or in addition, the detection and response device may have its own storage device 832. As will be described further below a storage device 832 may be used to store data defining events, event types, geographic locations, predefined views, and instructions for responding to events, among other things. Like the other devices in communication with the detection and response device 828, the storage devices 832 may be nodes as well, such as one or more storage nodes.

A storage device 832 may be used to store one or more logs regarding the operation of a detection and response system. For example, data created as a result of an event occurring and the operation of the detection and response device 828 may be collected in one or more logs. The log data may be used to audit or troubleshoot the detection and response device 828 if desired.

It is contemplated that, though not illustrated, the functionality of the various nodes described herein may also be used with the detection and response system 828. For example, authentication services from a server node or the like may be used to authenticate users or devices prior to permitting such users or devices access to the detection and response system 828, its capabilities, video, or other surveillance information.

Figure 10:
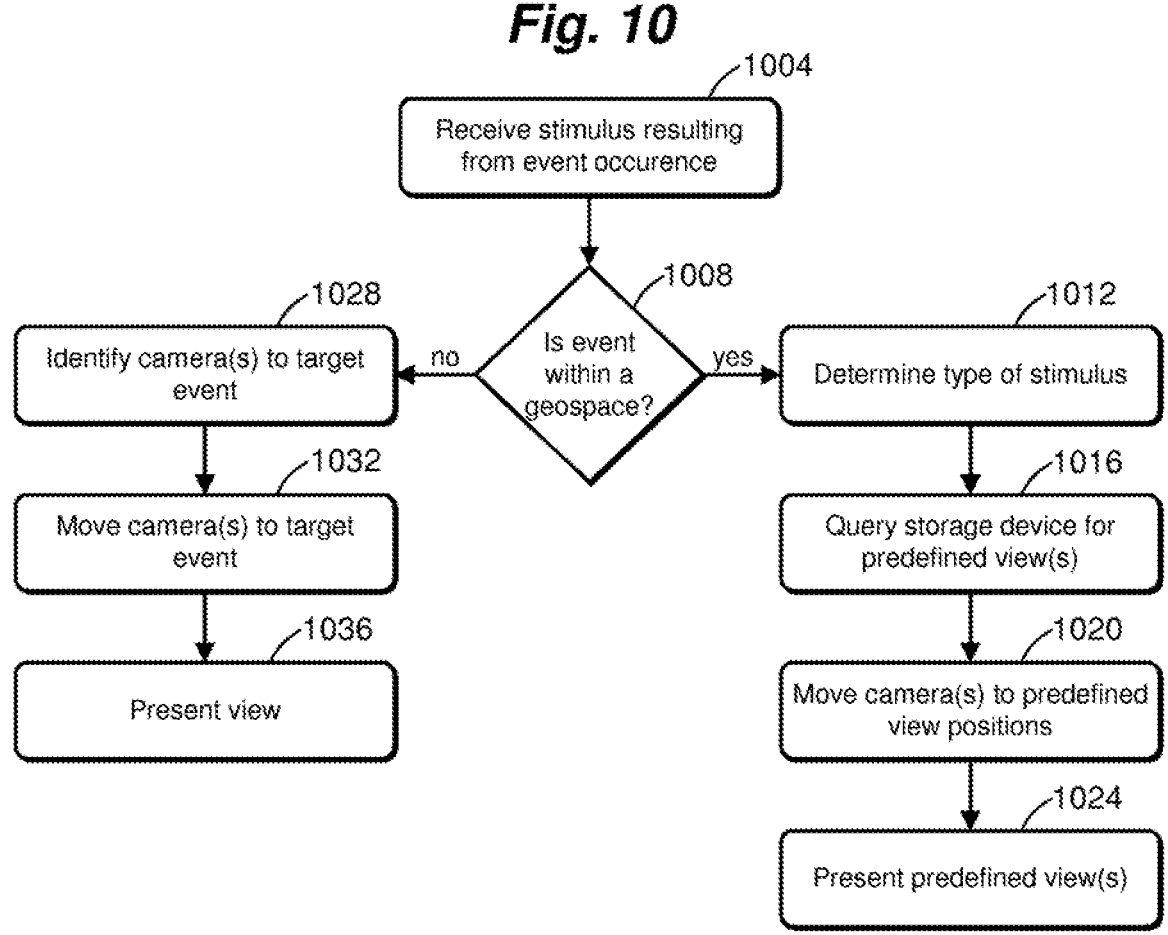
FIG. 10 is a flow diagram illustrating an exemplary response process.
Figure 11:
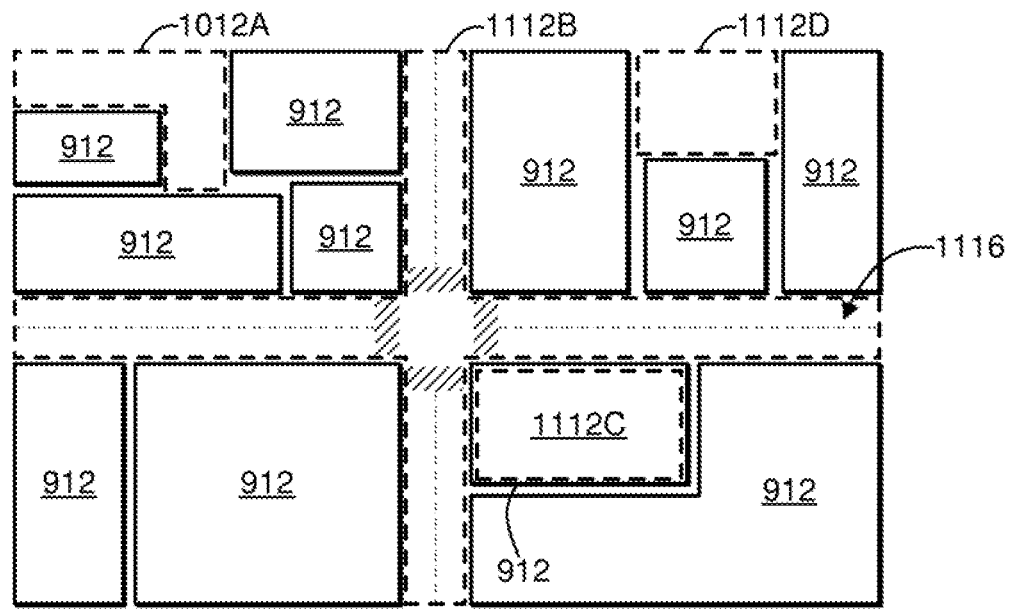
FIG. 11 is an overhead view illustrating exemplary geospaces.

Operation of an exemplary detection and response device will now be described with reference to FIG. 10 and FIG. 11. FIG. 10 is a flow diagram illustrating, at a high level, the operation of an exemplary detection and response device. FIG. 11, as will be described in the following, illustrates an exemplary environment to explain the concepts associated with such operation.

As can be seen, at a step 1004 the detection and response device may receive a stimulus resulting from the occurrence of an event. The stimulus may come from one or more capture devices, or the like in communication with the detection and response device. The stimulus may be data, such as surveillance information, created as a result of the event occurring and may be received by a transceiver of the detection and response device. For example, the detection and response device may receive an indicator that an event has occurred, or the device may receive data (such as a video stream) that represents the event. In the later case, the detection and response device may process the video to determine that an event has occurred. For example, the detection and response device may analyze or process a video to determine that a virtual tripwire has been tripped.

As stated above, the location of an event may be transmitted to or determined by the detection and response device. Once the stimulus resulting from an event occurrence has been received, it may determined at a decision step 1008, whether or not the even occurred within a particular geographical space or "geospace." In general, a geospace is a physical area that may be defined by a user, administrator, and/or personnel using or configuring the detection and response device.

FIG. 11 illustrates some exemplary geospaces 1112 represented by broken lines. In FIG. 11, the geospaces 1112 are illustrated among buildings 1104 at an intersection of two roads 1116. Geospaces 1112 may be various shapes and sizes and may be located at various locations. For example, in FIG. 11, one geospace 1112B corresponds to the streets/intersection and other geospaces 1112A, 112D correspond to areas adjacent the buildings 1104. Yet another geospace 1112C is defined within a building 912. It is noted that the geospaces 1112 may also have a defined altitude. In this manner, a geospaces 1112 may be a particular floor of a building 912, for example. In addition, in this manner, different geospaces 1112 may be on top of one another. For example, a geospace 1112 on or above the surface may be defined on top of a geospace of a subway station or line below the surface.

Geospaces 1112 may be polygonal, circular, square, rectangular, and various other shapes. For instance, a geospace 1112 may be defined with one or more curves or angles. It is contemplated that a geospace 1112 may be defined in various ways. For example, a geospace 1112 may be defined by one or more points or coordinates connected by lines or curves that form the periphery of the geospace. A geospace 1012 may also be defined as a circular or other shaped boundary extending around a point or coordinate. As can be seen from FIG. 11, a geospace 1112 may be defined according to or to correspond with physical or other landmarks. Geospaces 1112 may also be defined without regard to such landmarks. For example, a geospace 1112 may comprise a portion of a building, road, lot, or other area.

Data defining geospaces 1112 may be stored in a storage device accessible to the detection and response device. It is contemplated that a graphical user interface may be provided to allow a user to easily define geospaces 1112. For example, it is contemplated that the user may be presented with a map upon which a user may "draw" one or more geospaces 1112.

Though illustrated in a particular urban setting, it is noted that geospaces 1112 may be defined at various areas. For example, a geospace 1112 may be other areas adjacent a building (e.g., parking lot, entrance, exit). A geospace 1112 also need not be associated with a building or structure. For example, a geospace 1112 may be at a park, field, playground, or the like.

Referring back to FIG. 10, after step 1008, the detection and response device may perform different functions (i.e., respond differently) depending on whether or not an event is within a geospace 1112. If an event is within a geospace 1112, the detection and response device may respond in a predefined manner. If the event did not occur within a geospace 1112, one or more default responses may occur.

In one or more embodiments, the detection and response device responds according to one or more instructions. For example, a first set of instructions may be executed if an event is within a geospace 1112, while a second set of instructions may be executed if an event is not within a geospace. In addition, each geospace 1112 may be have its own instructions associated thereto. The instructions may be provided in various ways. For example, the instructions may be preset and provided by a manufacturer, distributor, or the like of the detection and response device. The instructions may also be provided by one or more users of the detection and response device.

It is contemplated that a user interface may be provided to allow the user to create instructions for devices that may be controlled by the detection and response device. For example, C, C#, or C++ (or other language) development environment could be used or a flow charting type user interface could be used to create the instructions. The user interface may be configured to present only instructions that are within a selected device's capabilities in some embodiments. For example, instructions to zoom in or out may not be provided for a camera without a zoom function.

The instructions may control a variety of devices in communication with the detection and response device to provide a desired response to an event. For instance, in addition to controlling cameras as part of a response, the instructions may control one or more video monitoring devices, viewing nodes, or the like. For example, the instructions may read data for a predefined view (from a storage device) and setup the predefined view at a user interface. It is contemplated that the instructions may control other devices such as capture devices, cameras, video recording devices, video monitoring devices, and nodes discussed above.

As stated, each geospace 1112 may be associated with one or more instructions. This may occur by storing the instructions such that there is a link between the instructions and their associated geospace 1112. The instructions may be stored on a storage device accessible to the detection and response device. In one embodiment, the instructions may be stored on the same storage device as the geospace 1112 to which they are associated.

It is contemplated that one or more instructions may be associated with multiple geospaces 1112 if desired. For example, instructions for geospaces 1112 corresponding to one or more particular areas may also be associated with a geospace corresponding to another area. To illustrate, instructions for geospaces 1112 corresponding to ingress and egress areas of a building (or other location) may also be associated with geospaces within the building. In this manner, if an event, such as an alarm occurs within a building (or other location), instructions to target cameras on the ingress and egress areas of the building may be carried out in addition to any instructions associated with the geospaces located within the building.

Referring to FIG. 10, if the event occurred within a geospace 1112, the type of event that occurred may be determined at a step 1012. This allows the response provided by the detection and response device to differ based on the type of event. For example, the detection and response device may respond to a water leak event (or other anomalous building system event) by activating and/or targeting one or more cameras at the event. In response to a burglar or other alarm however, the response may include bringing up a predefined view, notifying security or other personnel, recording video, and other actions in addition or instead of activating/targeting one or more cameras.

Events may be categorized into types as desired. In one embodiment, the detection and response device may include one or more predefined event categories. In addition or alternatively, events may be categorized by one or more users as desired. It is contemplated that a user interface may be provided to accept user created categories and/or to associate events with the categories based on their types. The categories and event associations to the categories may be stored on a storage device accessible to the detection and response device.

Some exemplary types of events include, alarms, notifications, security events, temperature warnings, moisture warnings, pressure warnings, presence detection (of one or more individuals), air content/smoke detection, gunshot detection, sound detection, motion detection, and tripwire triggers, among others. The categorization of events not only helps determine a response but also allows events to be organized for a user. For example, the user interface, such as in a predefined view, may list events by type and allow a user to easily switch between viewing events of different types.

At a step 1016, one or more instructions associated with a geospace 1112 (in which the event has occurred) may be identified according to the type of event that has occurred. The instructions may then be executed by the detection and response device. For example, at a step 1020 one or more cameras may be moved to various positions according to the instructions. At a step 1024, a predefined view may be set up by the instructions on the user interface of a video monitoring device or the like.

If the detection and response device is connected to a traditional surveillance system, it is contemplated that at step 1020, the instructions may cause one or more video feeds from the traditional surveillance system to be presented for viewing in a predefined view. This is highly beneficial in that it takes advantage of cameras that may already be installed. It is contemplated that the instructions may specify a single or a limited number of video feeds from the traditional surveillance system to present. In this manner, only the most relevant video feed(s) are presented. For example, in a system with numerous parking lot cameras, the detection and response system may present video feeds only from a selected one (or more) of the cameras as part of a response. Since it is relatively easy to obtain individual video feeds from traditional surveillance systems, it can be seen that the detection and response system may leverage a large number of existing surveillance systems and their individual cameras.

Figure 12A:
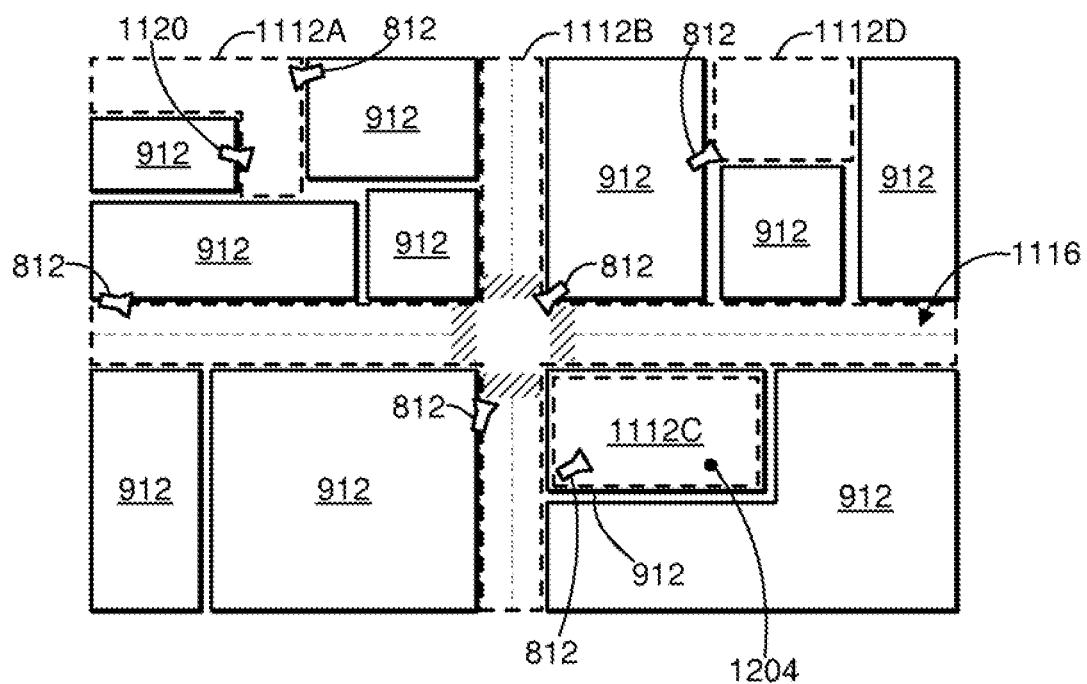
FIGS. 12A-12C illustrate operation of an exemplary detection and response device in response to an event within a geospace.

An automated response that may differ based on the geospace and/or event type is highly advantageous for surveillance purposes. Referring to FIG. 12A, it can be seen that an event 1204 has been detected within geospace 1112C. For the purpose of illustration, the event 1204 in this case is an alarm and the geospace 1112C is within a building 912 that is a bank.

Figure 12B:
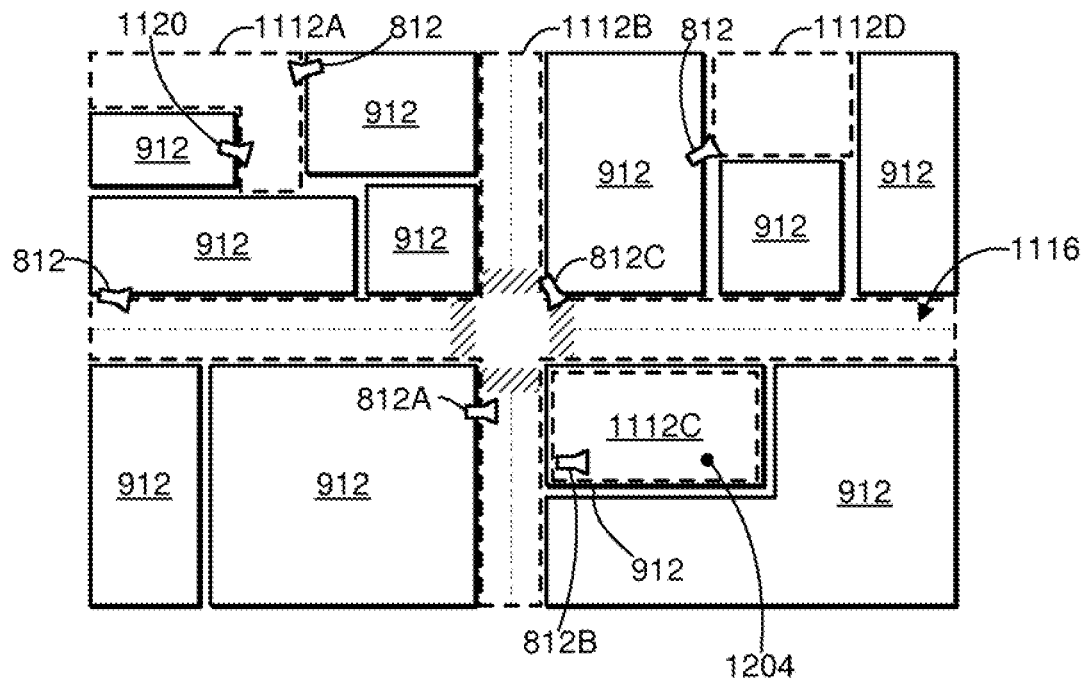

As a result of the event 1204, the detection and response device may execute one or more instructions associated with geospace 1112C based on the event's type. In this example, the event is relatively serious in that it is an alarm at a bank. The instructions may move several cameras 812 accordingly. For example, in FIG. 12B, cameras 812A,812B,812C have been moved. The cameras 812 may be at or adjacent the event 1204 and/or may be remote from the event. For instance, in FIG. 12B the camera 812B within the geospace 1112C has been moved, such as to focus on the event 1204. Cameras 812A,812C that are outside the geospace 1112C have also been moved, such as to focus on the bank's egress and ingress areas. In addition, though not shown, other cameras 812 may be moved to provide a view of likely escape routes, such as roads, highways, and the like. It can be seen that cameras 812 may be at a variety of locations, including within buildings 912 or other structures.

Figure 12C:
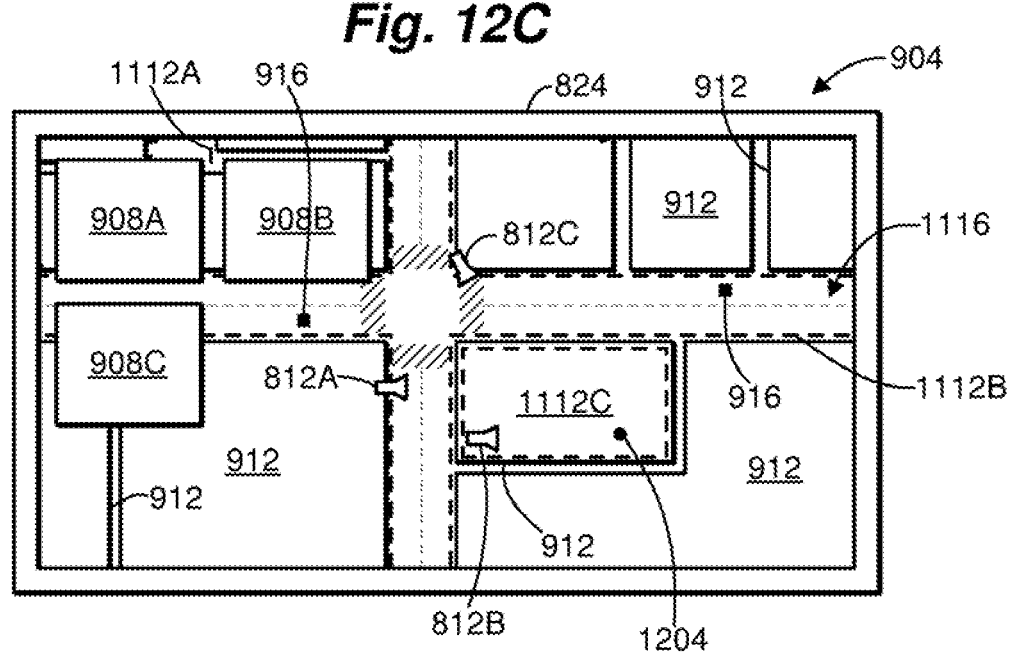

FIG. 12C illustrates an exemplary predefined view 904 for this example. As can be seen, the instructions may generate predefined view 904 that is idealized for the type of event 1204 that is occurring at this geospace 1112C. In this example, the predefined view 904 includes user interface windows 908 showing the egress area (camera 812A and interface window 908A), ingress area (camera 812C and interface window 908C) of the bank, and an internal view (camera 812B and interface window 908B) of the bank where the event 1204 occurred.

The camera response and setup of the predefined view 904 may occur immediately after the event 1204 is detected. In this manner, the user is provided with a near instantaneous view of the event 1204 and views of areas that are likely to be relevant to the event (based on the event's type and the geospace in which it occurred). Since the user interface may be automatically configured according to an optimized predetermined view 904, the user is also provided with an ideal view of the event 1204 and related areas. In addition, the detection and response device may also begin recording video or other surveillance information once the event 1204 is detected for later review.

It is noted that the predefined view 904 also shows available units 916. If these units 916 have cameras, their video may also be available to the video monitor 824, such as via a wireless communication link. Alternatively or in addition, video may be routed or shared with these units 916. For instance, an entire predefined view 904 may be presented on a video monitor carried by these units 916 or a portion of the predefined view, such as one or more individual videos, may be routed to the units.

A user may pan, rotate, zoom or otherwise manipulate the map or other display presented on a predefined view 904. In addition, the user may interact with elements shown on the predefined view 904. For example, the user may "click" or select cameras 812, units 916, buildings 912, roads 116, geospaces 1112 and other objects. Context menus or other user interface elements (e.g., windows, dialog boxes, etc. . . . ) may be presented as a result. For example, a context menu for creating, editing, or viewing instructions for a geospace 1112 may be presented by clicking on a geospace. Likewise, geospaces 1112 may be created, edited, or viewed by clicking or highlighting a location for the geospace. Geospaces within a building 912 or at other locations may be created, edited, or viewed by clicking on the building.

Cameras 812 may be controlled (e.g., pan, tilt, zoom) by a user by selecting the desired camera(s). One or more preset views may be selected as well by clicking on or selecting the desired camera(s) 812. It is noted that actions may be performed on units 916 as well by selecting or clicking on the units. For example, a context menu or other interface element may be display to activate communications with a unit 916, share video (or other surveillance information) with the unit, and/or receive/request video (or other surveillance information from) the unit.

The user may also interact with events 1204 by selecting an event from the predefined view 904. For example, clicking an event 1204 may allow a user to view additional information regarding the event, or reset one or more alarms related to the event. Such additional information may include the time of the event, the capture device that captured the event, the address at or near where the event occurred, or the like. It is contemplated that a user may simulate an event's occurrence, such as by clicking on the map provided by a predetermined view 904. This allows the user to test the response provided by the detection and response system.

The user may also transmit information to an output device at or near the event 1204 by selecting the event, or by selecting the output device itself. For example, in one or more embodiments a speaker may be controlled by the user to emit one or more sounds/alarms, distracting or loud sounds, non-lethal painful/disabling sounds, or other audio. It is contemplated that the speaker may also or alternatively be used to speak to people at or near an event site. A microphone may be provided to permit such communications. The microphone may be part of a video monitor 824 in some embodiments.

Figure 13:
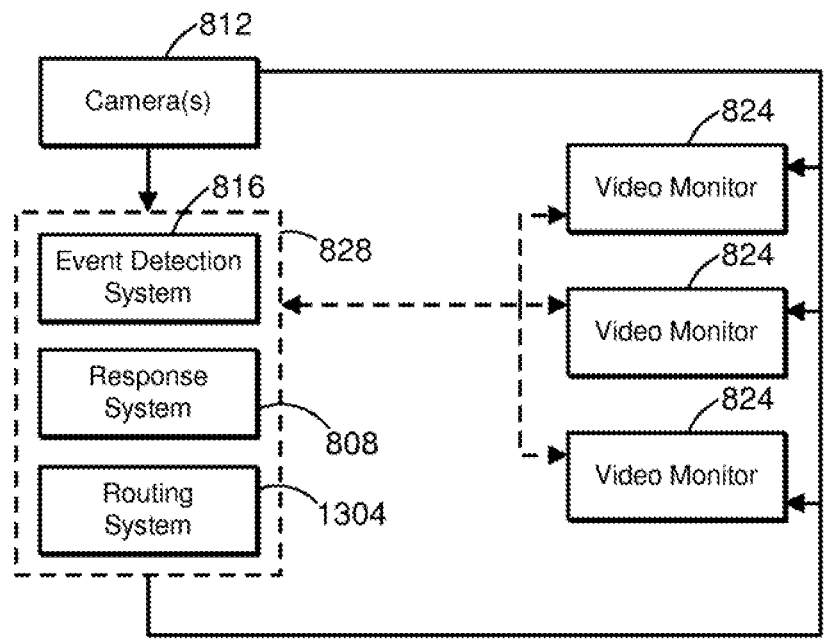
FIG. 13 is a block diagram illustrating sharing of surveillance information.

Referring to FIG. 13, to allow sharing of video (or other surveillance information) the detection and response device 828 may be configured to route video to various video monitors 824. In FIG. 13, the solid lined arrows represent exemplary paths a video may take from its source (e.g., a camera 812) to a destination (e.g., a video monitor 824). It is noted that video from various sources may be routed, including video feeds from camera(s) of private or traditional surveillance systems.

The detection and response device 828 may comprise a routing system 1304 that may route video from one or more cameras 812 to various video monitors 824. In one embodiment, the routing system 1304 may accept a video stream and then transmit it to one or more video monitors 824, as shown by the solid arrows of FIG. 13. The routing system 1304 may include one or more codecs to transcode the video stream if desired. For example, the video stream may be converted to a lower bandwidth stream for transmission over lower bandwidth communications links, such as mobile or wireless links.

Alternatively or in addition, the routing system 1304 may direct a video monitor 824 to a camera 812 that is providing a video stream requested by the video monitor. For instance, the user of a video monitor 824 may wish to view an ingress area of a building and may request such video stream from the detection and response device 828. Such a request is illustrated by the broken lined arrows of FIG. 13. In response, the detection and response device 828 may direct the video monitor 824 to the camera 812 providing a view of the ingress area. In one embodiment, the routing system 1304 may store a network addresses (or other identifying information) of the one or more cameras 812 and direct the video monitor 824 to a camera by providing the network address of the camera. Subsequently, a video may be directly transmitted from the camera 812 to a video monitor 824, as shown by the solid lined arrows of FIG. 13. It is contemplated that the muting system 1304 may be an independent device remote from the detection and response device 828 in some embodiments. For example, the routing system 1304 may be embodied in a server node or other device.

In some situations, at least one predefined view may be provided to a video monitor at a command center or dispatch center where appropriate personnel (e.g., a commander or dispatcher) may have convenient access to a video monitor 824 (or the like). As stated, such video monitor 824 may be at other locations as well, and may be mobile or portable such as by being carried by vehicles, pedestrians or other units. In addition, a predefined view may be shared to (i.e., presented on) multiple video monitors at various locations. The detection and response device's instructions may be configured to provide the predefined view(s) at the location(s) desired.

Individual video or other surveillance information streams may be viewed at various video monitors 824. For example, law enforcement or other units may be equipped with a video monitor 824 capable of receiving and displaying video or other surveillance information. The video monitor 824 may be portable or handheld in some embodiments. A dispatcher or the like at the dispatch center may then route or share video with these mobile video monitors. It is contemplated that part of a response to an event may be to pull up and display law enforcement or other units at or near an event. The dispatcher may then share video with these units quickly and easily. For example, the dispatcher may drag a video to an icon or other representation of a unit to share the video with the unit. Alternatively or in addition, the dispatcher may specify that a particular video stream be provided to a particular unit. It is contemplated that the video stream may be automatically provided to units as part of a response to an event.

In some embodiments, a unit may choose whether or not to accept the video stream at its video monitor 824. It is contemplated that the unit may also or alternatively request or select various video streams. For example, a video stream may be selected from available video streams from various cameras 812. Since the video monitors 824 may be portable and communicate wirelessly, it can be seen that video or other surveillance information may be shared to a variety of locations and units.

Referring back to FIG. 10 if at decision step 1008, it is determined that an event is not within a geospace, a default response or responses may be carried out. Such an event will be referred to in the following as a random event. In one embodiment, if a random event occurs, one or more cameras within range of the random event or capable of viewing the random event may be identified at a step 1028. Such identification may occur in various ways as will now be described with regard to FIGS. 14A-14C.

Figure 14A:
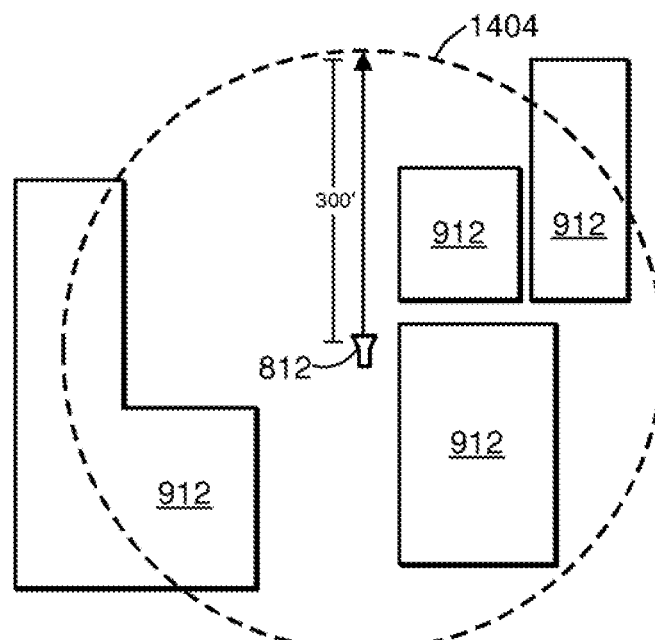
FIGS. 14A-14C illustrate operation of an exemplary detection and response device in response to a random event.

In one or more embodiments, some or all the cameras 812 may have a defined camera range and/or viewable area. The camera range and viewable area may be defined in various ways. For example, the camera range may a radius around a camera. To illustrate, FIG. 14A shows an exemplary camera range 1404 comprising a radius of 300 ft around the camera 812. It will be understood that various distances may be used. In one or more embodiments, the distance may be based on the camera's capabilities, such as its focusing or zooming capabilities.

The detection and response device 828 may provide an enhanced camera targeting feature in one or more embodiments. Because of obstructions, such as trees, buildings 912, poles, and the like, only some cameras 812 may have a view of a particular area even though the area may be within the range of more cameras. For instance, FIG. 14A shows that obstructions, such as buildings 912, may be within the camera's range 1404. In one or more embodiments, the detection and response device 828 may point or otherwise move one or more of the cameras 812 to focus on a target area based on the view of the area from the cameras' perspective. For example, if one camera's view of an event location is obstructed, for example by a tree or building 912, the detection and response device 828 may point another camera 812 with an unobstructed view at the area, and/or direct a camera with an obstructed view to a logical egress location.

Figure 14B:
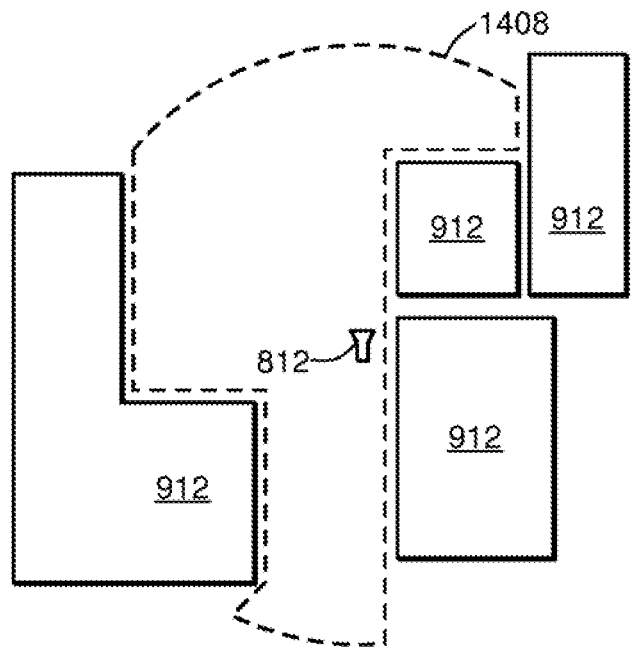

As stated, these may interfere or block a camera's view. In one or more embodiments, a viewable area for a camera 812 may be defined. FIG. 14B illustrates an embodiment where the viewable area 1408 has been defined. As can be seen, the viewable area 1404 comprises a shape that maps out or defines the area or areas that can be seen by the camera 812. Though shown as a contiguous shape, it is noted that a viewable area 1408 may comprise one or more separate areas. In addition, the viewable area 1408 may have a variety of shapes including various lines, angles, and curves.

One or more camera ranges 1404, viewable areas 1408, or both may be defined for the cameras 812. These definitions may be stored, such as on a storage device. The definitions may be linked or associated with an identifier and other information about individual cameras 812. In one or more embodiments, a user interface may be provided to permit a user to easily define the camera ranges 1404 and the viewable areas 1408 (e.g., coordinates and connecting lines or curves). Referring back to FIG. 10, at step 1028, the camera ranges and/or viewable areas may be queried to identify one or more cameras capable of providing a view of the random event.

Since the nature of a random event is difficult to predict, it is contemplated that both camera ranges and viewable areas may be used to identify or select one or more cameras to target the random event. For instance, referring to FIGS. 14A-14B, a random event may occur at a location outside a camera's viewable area 1408. In such case, the camera 812 may still be selected (to target the random event) based on the camera's camera range 1404. Though such camera 812 may provide only a blocked or obstructed view of the random event, a user may then pan, tilt, zoom, or otherwise manipulate the camera to capture relevant video or other surveillance information from the random event.

It is contemplated that the detection and response device may be configured to utilize camera range 1404 as a secondary consideration to the viewable areas 1408. For example, if one or more viewable areas 1408 cover the random event, the detection and response device may not need to query its camera ranges 1404 or utilize camera ranges to identify the camera(s) it will target at the random event. Alternatively, in other embodiments, camera ranges 1404 and view able areas 1408 may both be used to identify cameras. It is also contemplated that camera range 1404 may be an alterable preset setting of the detection and response device and may be used where a user or other personnel has not yet defined a viewable area 1408.

Figure 14C:
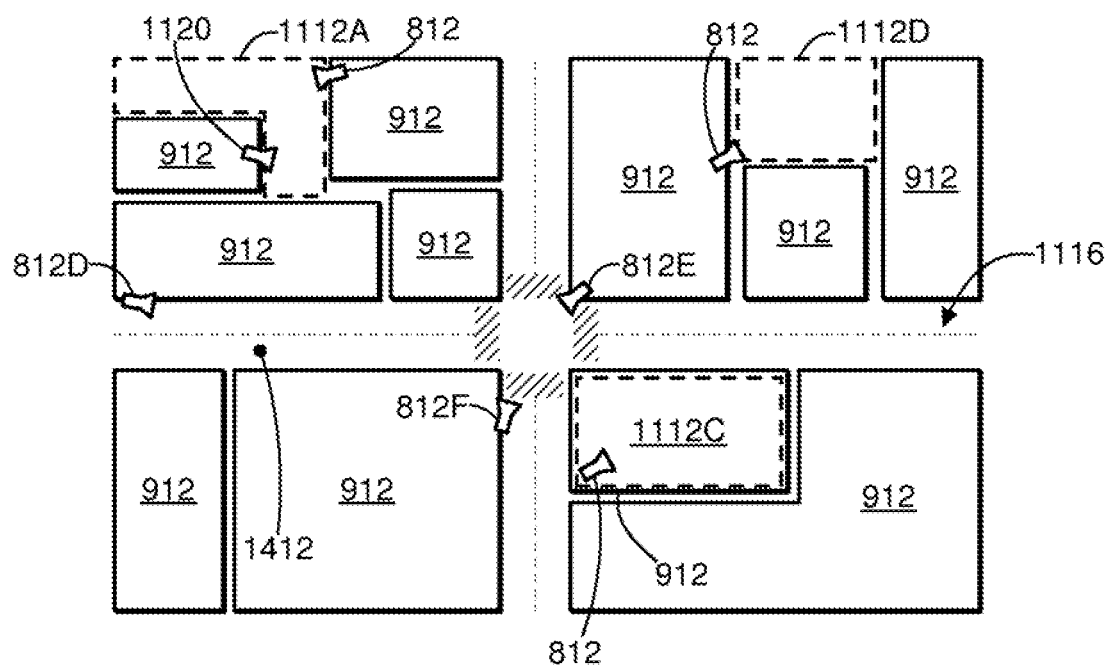

FIG. 14C provides an example of the use of camera ranges 1404 and viewable areas 1408. A random event 1412 (i.e., an event occurring outside a geospace 1112) has been detected in FIG. 14C. As can be seen, cameras 812D,812E may have a camera range and viewable area that cover the random event 1412. These cameras 812D,812E may be selected and used to provide a view of the random event 1412.

Camera 812F may have a camera range that covers the random event 1412 but has an obstructed view due to the building 912 between it and the random event. Camera 812F may also be selected to target the random event 1412 based on its camera range. In such case, camera 812F may provide an obstructed view but may capture relevant video, such as if a person of interest crosses the intersection of the road 1116. It is noted that a user may reposition the camera 812F to provide a better view of the intersection (such as by using a user interface provided by a default view). Alternatively, camera 812F may not be selected to target the random event 1412 because the event is not within the camera's viewable area.

Once one or more cameras that are capable of providing a view of the random event have been identified or selected at step 1028, some or all of these cameras may then be moved to target or focus on the event at a step 1032. Some or all of the identified cameras may then be moved or otherwise targeted at the random event. It is noted only the closest one, two, or other predefined number of cameras may be targeted at the random event in some embodiments. Alternatively, all the identified cameras may target the event.

It is noted that a mapping between camera positions, zoom levels, and the like, and the viewable locations provided by such positions/zoom levels may be created and used to target the camera such that it provides a view of the event. Such a mapping may be stored on a storage device.

It is contemplated that the various ways of identification and movement of cameras disclosed herein may be applied to default responses as well as predefined responses for events occurring within a geospace. For instance, camera ranges and/or viewable areas may be presented to a user to assist the user in determining which camera(s) to use in a predefined response. In addition, a predefined response may utilize some automation in selecting and targeting cameras. For example, mobile cameras or other cameras with an unpredictable location may be targeted at an area as part of a predefined response. These cameras may be automatically selected and targeted using their respective camera range and/or viewable area definitions.

A default view having video from the targeted cameras may then be presented via a video monitor at a step 1036. The default view may have a similar appearance to a predefined view in that one or more interface windows having video or surveillance information therein may be presented along with a map or other view of a geographic area. The default view may provide the same or similar functionality (i.e., user interface, controls, output display, etc. . . . ) as a predefined view as well. However, the default view will may simply provide an arrangement of video (or surveillance information) from the closest cameras (or other capture devices) to the event and will typically not be as ideal as a predefined view. This is generally because a predefined view is a view created by a user for ideal views of a particular event occurrence. The default view will typically be provided without consulting any previously stored predefined view, such as those created by a user.

As described above and illustrated FIG. 8, the detection and response device 828 may have access to a storage device 832 to both store and retrieve information related to its operation. For example, as discussed above, one or more geospaces and their associated instructions may be stored in a storage device 832. The information may be embodied or implemented in a variety of formats. For example, the location information may be in XML format. Of course, other data formats now known or later developed may be used. For example, the information may be in CSV or other text format. Binary data formats may also be used. The information may also be stored in a database in some embodiments.

Various data and information that may be stored and/or used during operation of the detection and response device will now be described. In one or more embodiments, location information may specify the location of one or more events or objects (e.g., cameras, video monitors, units, geospaces, viewable areas, etc. . . . ). In general, location information specifies at least one location. For example, the location information may be GPS coordinates, a longitude and/or latitude, an altitude, or other information which identifies a location for an event, camera, unit, or other item. The location information may be relative to a known or fixed location in some embodiments. For example, 20 ft west of A, where A is a known or fixed location. In addition, location information may a name, label, or other identifier associated with a particular location. For example, the location information may be the name of a building, landmark, street, or the like having associated GPS coordinates or an associated longitude, latitude, and/or altitude.

In one embodiment, location information may be included as part of information describing or regarding a detected event (i.e., event information). For example, event information may comprise a description/type of the detected event (e.g. a gunshot) and the location information indicating where the event occurred. It is noted that event information may include specific details regarding the event such as the time it occurred, a subcategory or classification of the event (e.g. handgun shot, shotgun shot, explosion), and the strength or size of the event if applicable (e.g. small or large explosion). Like location information, event information may be in a variety of formats.

In one embodiment for instance, event information may be in XML format, such as in the following example.

```
<EventDetection>
    <Id>1053</Id>
    <Lat>38.85962</Lat>
    <Lon>-76.98861</Lon>
    <Type>1</Type>
    <Time>2006-10-18 14:00:36</Time>
</EventDetection>
```

Camera information may be used to identify cameras, their location, capabilites, or various combinations thereof. For example:

```
<CameraItem>
    <Latitude>34.0574777777778</Latitude>
    <Longitude>-117.18275</Longitude>
    <Name>Orange and Redlands</Name>
    <IPAddress>10.15.3.128</IPAddress>
    <Range>300</Range>
    <HasSpeaker>false</HasSpeaker>
    <IsSelected>false<IsSeleted>
</CameraItem>
```

As can be seen, camera information may define the latitude, longitude, and/or name of a camera. In addition, the camera's IP address may be stored to allow access to the camera's video stream or administrative interface. As can also be seen, a camera range may be specified in the camera information.

Camera preset information may be used to target a camera to provide a view of a particular area or event. For example, one or more preset camera positions may be linked to or associated with one or more individual cameras, such as one or more <CameraItem> entries in the camera information. In the following example, a camera may be targeted to a preset latitude/longitude such as by sending it a name or other identifier of the desired preset.

```
<PresetList>
    <Preset>
        <Latitude>34.0573196411133</Latitude>
        <Longitude>-117.18440246582</Longitude>
        <Name>P50</Name>
        <PresetID>50</PresetID>
    </Preset>
    <Preset>
        <Latitude>34.0571937561035</Latitude>
        <Longitude>-117.183372497559</Longitude>
        <Name>P51</Name>
        <PresetID>51</PresetID>
    </Preset>
</PresetList>
```

The camera information may also have a list of one or more camera coverage areas associated or linked thereto. The item(s) in this list may define one or more viewable areas for a camera. For example:

```
<CameraCoverageList>
    <LatLng>
        <Latitude>34.0574226379395</Latitude>
        <Longitude>-117.185279846191</Longitude>
    </LatLng>
    <LatLng>
        <Latitude>34.0574684143066</Latitude>
        <Longitude>-117.182716369629</Longitude>
    </LatLng>
</CameraCoverageList>
```

Geospace information may be used to define one or more geospaces. As can be seen from the following, a geospace may be identified by one or more points or coordinates. These points may be connected to form an area (which forms a geospace). A geospace may also have a name and priority for display or categorization purposes.

```
<GeoSpace>
    <Name>Texas and Redlands</Name>
    <Priority>5</Priority>
    <GeoPointList>
        <LatLng>
            <Latitude>34.058032989502</Latitude>
            <Longitude>-117.191566467285</Longitude>
        </LatLng>
        <LatLng>
            <Latitude>34.0578994750977</Latitude>
            <Longitude>-117.191116333008</Longitude>
        </LatLng>
        <LatLng>
            <Latitude>34.0574913024902</Latitude>
            <Longitude>-117.191123962402</Longitude>
        </LatLng>
        <LatLng>
            <Latitude>34.057544708252</Latitude>
            <Longitude>-117.191581726074</Longitude>
        </LatLng>
    </GeoPointList>
```

One or more response instructions may be linked to or associated with geospace information. For example, instructions to setup a predefined view and/or to select which camera's videos will be presented in the predefined view may be associated with one or more individual geospaces, such as one or more <GeoSpace> entries in the geospace information. An example or response instructions or response information is as follows.

```
<PaneLayout>
    <Rows>3</Rows>
    <Columns>3</Columns>
    <LeftPaneView>false</LeftPaneView>
</PaneLayout>
<GeoSpaceActionList>
    <GeoSpaceAction>
        <Position>0</Position>
        <IPAddress>10.15.11.133</IPAddress>
        <PresetID>50</PresetID>
    </GeoSpaceAction>
    <GeoSpaceAction>
        <Position>1</Position>
        <IPAddress>10.15.3.129</IPAddress>
        <PresetID>61</PresetID>
    </GeoSpaceAction>
</GeoSpaceActionList>
```

As can be seen, the <PanelLayout> section defines various user interface elements for a predefined view, while the <GeoSpaceActionList> defines positions for videos within the predefined view. The <GeoSpaceActionlist> also defines a source camera by its IP address, and a preset (as discussed above) to which the camera may be moved/focused to target an event or area.

Building information may identify the location of one or more buildings in one or more embodiments. For example, a building map list may be used to place an icon or other identifier on a map (such as a map presented in a predefined view or other view) that represents a building. For example the following <BuildingMap> may be used to specify coordinates which allow the icon to be correctly placed on a map. An identifier, such as the <BuildingMapID> may be used to link this building information to other information.

```
<BuildingMapList>
    <BuildingMap>
        <Latitude>34.0597381591797</Latitude>
        <Longitude>-117.201477050781</Longitude>
        <BuildingMapID>0x10002BB</BuildingMapID>
    </BuildingMap>
</BuildingMapList>
```

When a cursor is placed over the icon or the icon is otherwise activated, additional information about a building may be provided. For instance, an image or other representation of the building or characteristics of the building (e.g., graphic of a two story structure may represent that the building has two floors) may be displayed. It is contemplated that individual floors, rooms, or other areas of a building may be selected to display information regarding these areas of the building. For example, the image may contain one or more hyperlinks that allow a user to select individual areas of a building. Once selected a map of the selected area may be displayed. For example, if the user clicks the first floor of a building, a map of the first floor may be displayed. It is contemplated that this map may contain icons representing cameras that, when selected or clicked, may display video from the selected camera. The icons may be placed on the map to represent the location of the cameras in the area.

Stimulus information may define one or more stimuli or events. The stimulus information may define the type of event that has occurred and/or the name of the event. An example of stimulus information is as follows.

```
<StimulusDefinitions>
    <StimulusDefinition>
        <Stimulus>STIMULUS_911CALL</Stimulus>
        <StimulusName>911 Call</StimulusName>
        <Priority>5</Priority>
        <ForceRange>false</ForceRange>
    </StimulusDefinition>
    <StimulusDefinition>
        <Stimulus>STIMULUS_GUNSHOT</Stimulus>
        <StimulusName>Gun Shot</StimulusName>
        <Priority>5</Priority>
        <ForceRange>false</ForceRange>
    </StimulusDefinition>
    <StimulusDefinition>
        <Stimulus>STIMULUS_TRAFFIC_STOP</Stimulus>
        <StimulusName>Traffic Stop</StimulusName>
        <Priority>5</Priority>
        <ForceRange>false</ForceRange>
    </StimulusDefinition>
</StimulusDefinition>
```

The stimulus information may be linked to or associated with the one or more geospaces. For example, geospace information for individual geospaces may include stimulus entries as shown in the following.

```
<GeoSpaceStimulus>
    <Stimulus>
        <StimulusEntry>
            <Stimulus>STIMULUS_911CALL</Stimulus>
            <StimulusValue>true</StimulusValue>
        </StimulusEntry>
        <StimulusEntry>
            <Stimulus>STIMULUS_GUNSHOT</Stimulus>
            <StimulusValue>true</StimulusValue>
        </StimulusEntry>
        <StimulusEntry>
            <Stimulus>STIMULUS_TRAFFIC_STOP
            </Stimulus>
            <StimulusValue>false</StimulusValue>
        </StimulusEntry>
    </Stimulus>
</GeoSpaceStimulus>
```

Though particular arrangements of data have been shown above, it is contemplated that the different information may be stored. For example, some embodiments may omit some variables while others include additional variables. To illustrate, a <Preset> may not have a <Name> variable in some embodiments. In addition variables may be linked to or associated with other variables other than in the manner shown in the above.

In one or more embodiments, the detection and response device 828 may comprise a converter component which converts event or location information into a format that the detection and response device can utilize. For example, in an XML embodiment, the detection and response device 828 may utilize XSLT to convert event or location information from one XML format to one that is usable by the response system. It is contemplated that conversion may also occur in the opposite direction to allow information to be communicated from the detection and response device to another device.

Conversion of information is beneficial in that it allows the detection and response device 828 to receive event, location, or other information from a variety of capture devices 836 or other detection devices. This allows capture devices 836 from various manufacturers of various makes and models to be used with the detection and response device 828. It is contemplated that the converter component may be a software or hardware module thus allowing conversion of new or previously unsupported data formats to be provided as needed.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A surveillance system for providing automated responses to one or more events comprising:

one or more cameras;

one or more storage devices configured to store, for each of the one or more cameras, an associated range and viewable area, wherein the range is represented as a radius around the camera, and wherein the viewable area is represented as at least one shape that defines an area that can be seen by the camera; and a detection and response device in communication with the one or more cameras, wherein the detection and response device is configured to:

detect the occurrence of an event;

select at least one of the one or more cameras to target the event based on whether the event occurred within the range and viewable area of the one or more cameras, wherein the selected camera is a mobile camera that is carried by a vehicle;

control the selected at least one of the one or more cameras to target the event;

select one of the one or more cameras to target the event based on the camera range and the viewable area of each of the one or more cameras, wherein the event is not within the viewable area of the selected camera, wherein the event is within the range of the selected camera; and control the selected camera to target the event.

2. A method for responding to an event with a surveillance system having one or more cameras comprising:

receiving and storing on one or more storage devices, for each of the one or more cameras, an associated range and viewable area, wherein the range is represented as a radius around the camera, and wherein the viewable area is represented as at least one shape that defines an area that can be seen by the camera;

detecting the occurrence of the event with one or more sensors;

selecting at least one of the one or more cameras to target the event based on whether the event occurred within the range and viewable area of the one or more cameras, wherein the selected camera is a mobile camera that is carried by a vehicle;

control the selected at least one of the one or more cameras to target the event; and selecting at least one of the one or more cameras to target the event based on the camera range and the viewable area of the one or more cameras, wherein the event is not within the viewable area of the selected camera, wherein the event is within the range of the selected camera.

* * * * *